US 6,718,289 B1

United States Patent
Suzuki et al.

(10) Patent No.: US 6,718,289 B1
(45) Date of Patent: Apr. 6, 2004

(54) PROCESSING APPARATUS AND METHOD FOR SOLVING OPTIMIZATION PROBLEM

(75) Inventors: Ichiro Suzuki, Kanagawa (JP); Shigeru Kameda, Kanagawa (JP); Shoichi Masuda, Kanagawa (JP); Ikuo Fukuda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/447,055

(22) Filed: Nov. 23, 1999

(30) Foreign Application Priority Data

Jan. 26, 1999 (JP) .......................... 11-016500

(51) Int. Cl.[7] ............................. G06F 17/50

(52) U.S. Cl. .................. 703/2; 706/12; 345/420; 345/473

(58) Field of Search ................. 703/2; 345/420, 345/473; 706/12

(56) References Cited

U.S. PATENT DOCUMENTS

| 5,373,457 | A | * | 12/1994 | George et al. ............. 703/2 |
| 5,692,107 | A | * | 11/1997 | Simoudis et al. .......... 706/12 |
| 5,706,419 | A | * | 1/1998 | Matsugu et al. ........... 345/420 |
| 5,852,449 | A | * | 12/1998 | Esslinger et al. .......... 345/473 |
| 6,026,362 | A | * | 2/2000 | Kim et al. ................ 705/1 |
| 6,086,617 | A | * | 7/2000 | Waldon et al. ............ 703/2 |
| 6,253,164 | B1 | * | 6/2001 | Rohm et al. ............. 703/2 |
| 6,346,944 | B1 | * | 2/2002 | Suzuki et al. ............ 345/473 |
| 6,374,198 | B1 | * | 4/2002 | Schifa et al. ............. 703/2 |
| 6,411,922 | B1 | * | 6/2002 | Clark et al. .............. 703/2 |

* cited by examiner

Primary Examiner—Hugh Jones
Assistant Examiner—Herng-der Day
(74) Attorney, Agent, or Firm—Staas & Halsey LLP

(57) ABSTRACT

A processing apparatus changes deformation elements composing a shape representing a problem to be processed using a search termination condition, a sequencing algorithm for deformation elements, a cost function and a deformation pattern, and deforms the shape. Then, the processing apparatus searches for a shape with the minimum cost, and outputs the shape as a solution.

10 Claims, 49 Drawing Sheets

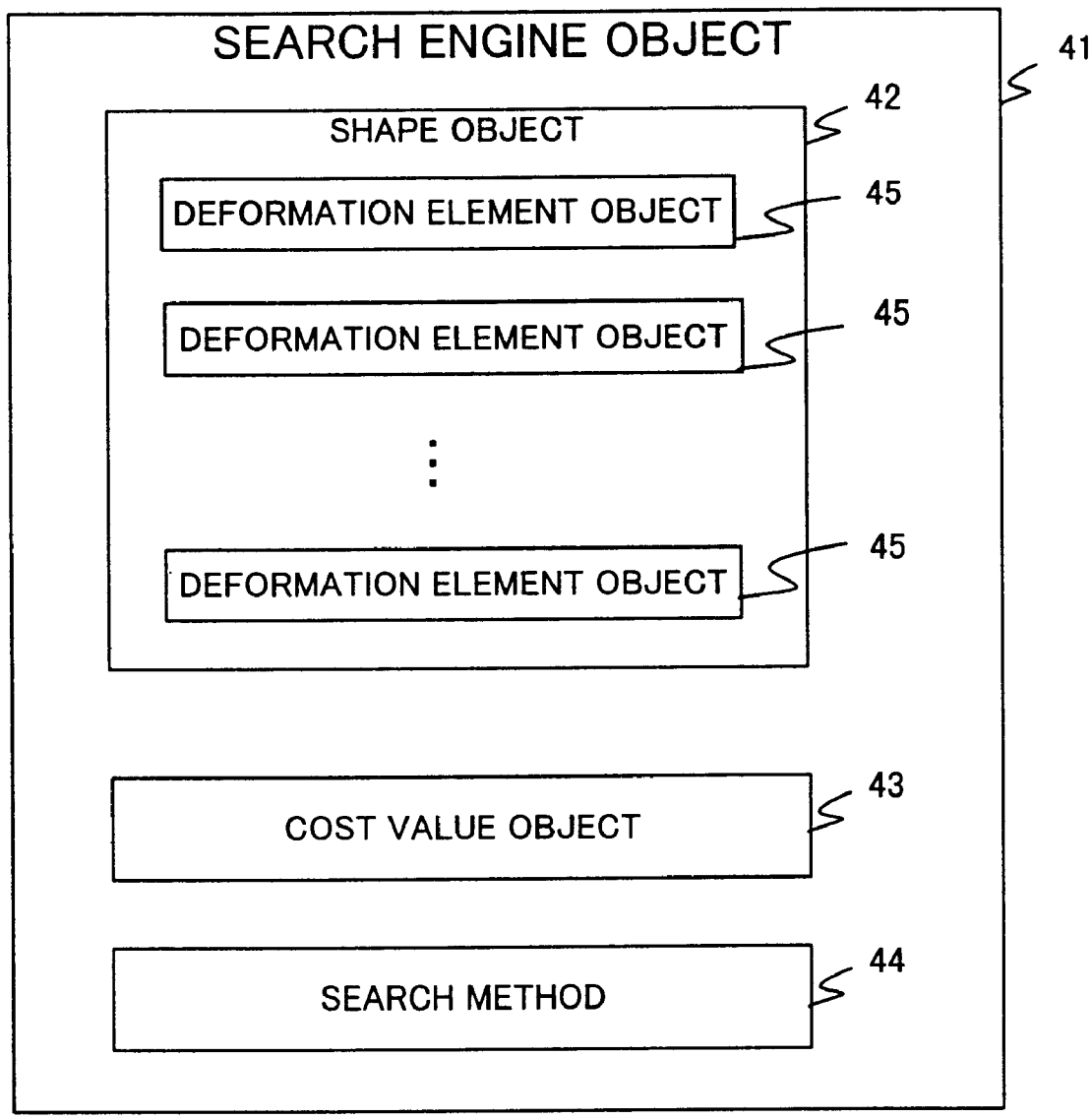
F I G. 3

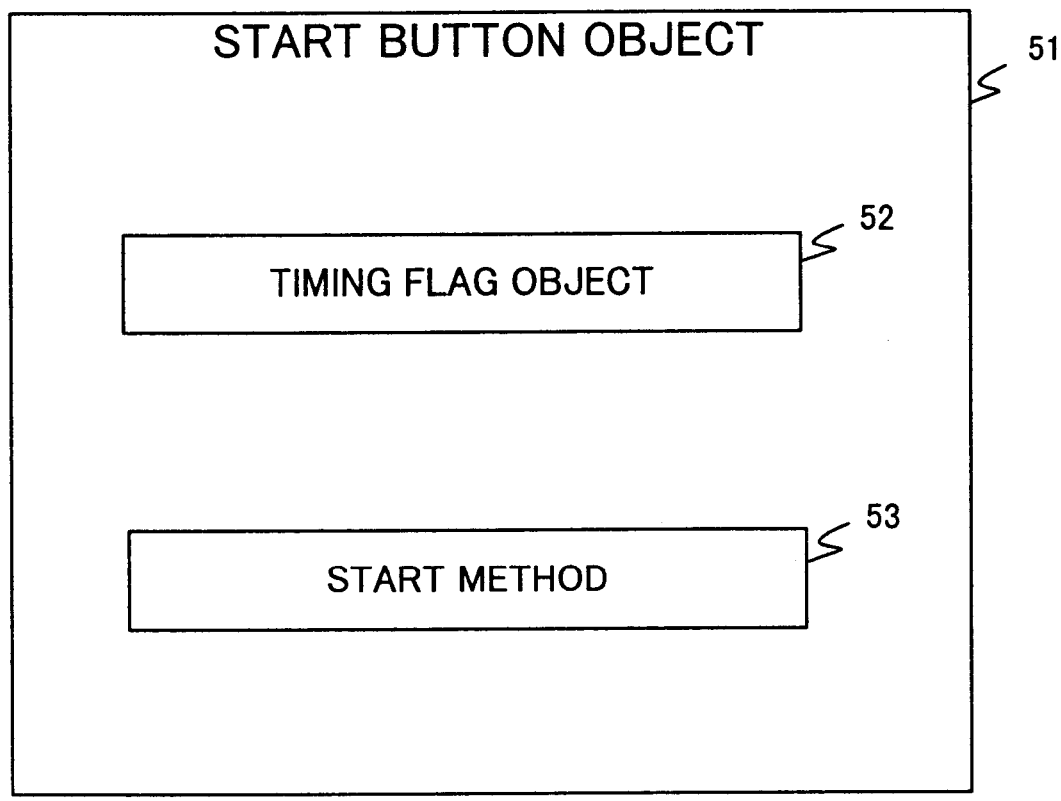
F I G. 4

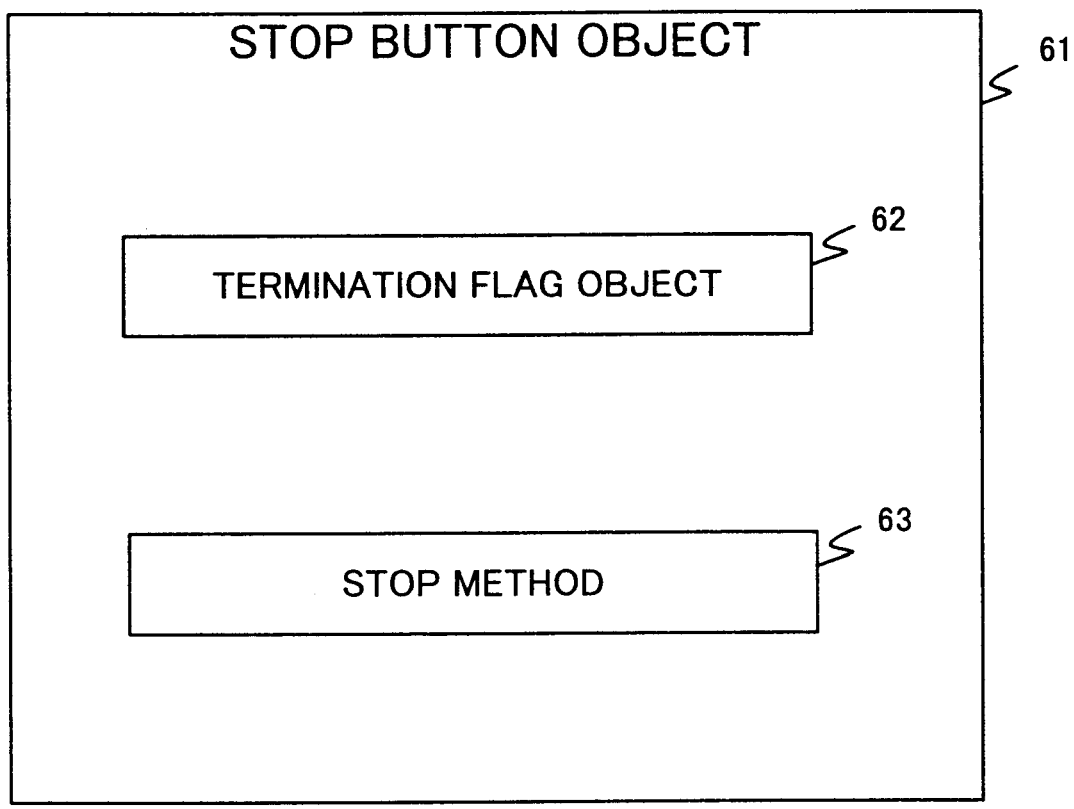
F I G. 5

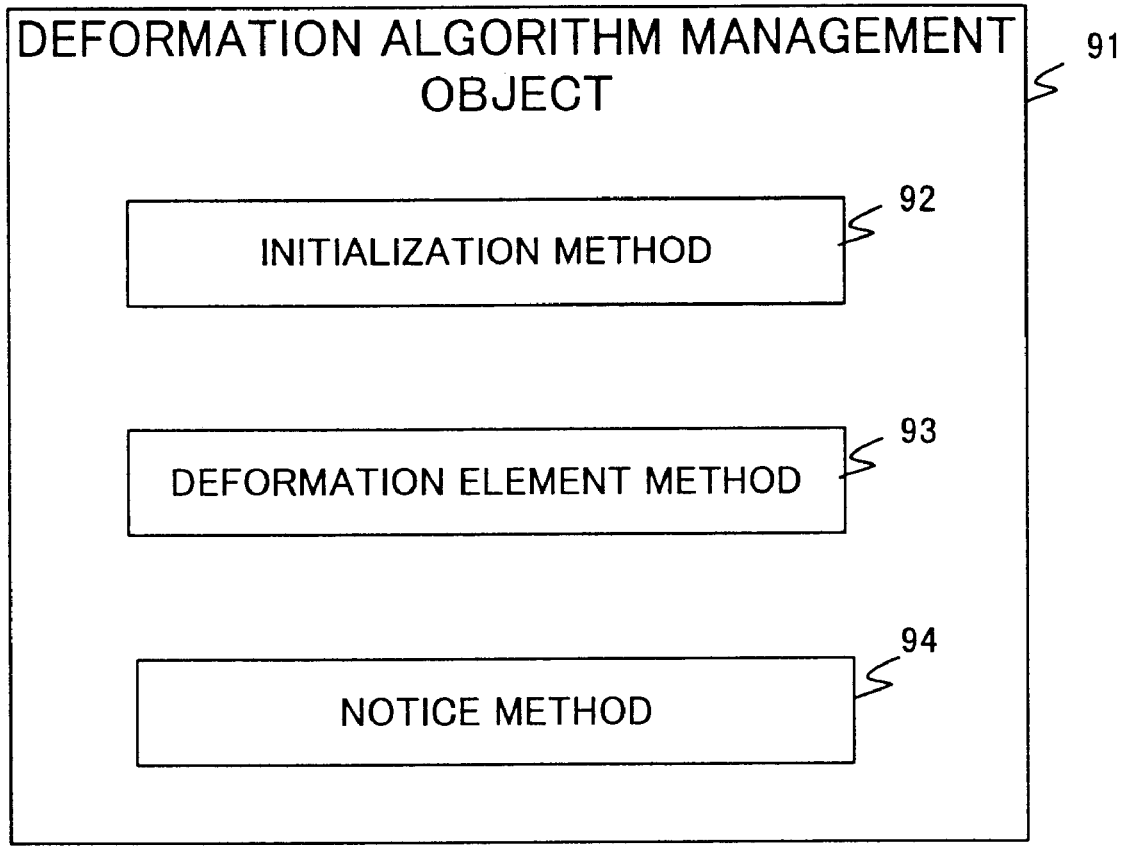
F I G. 8

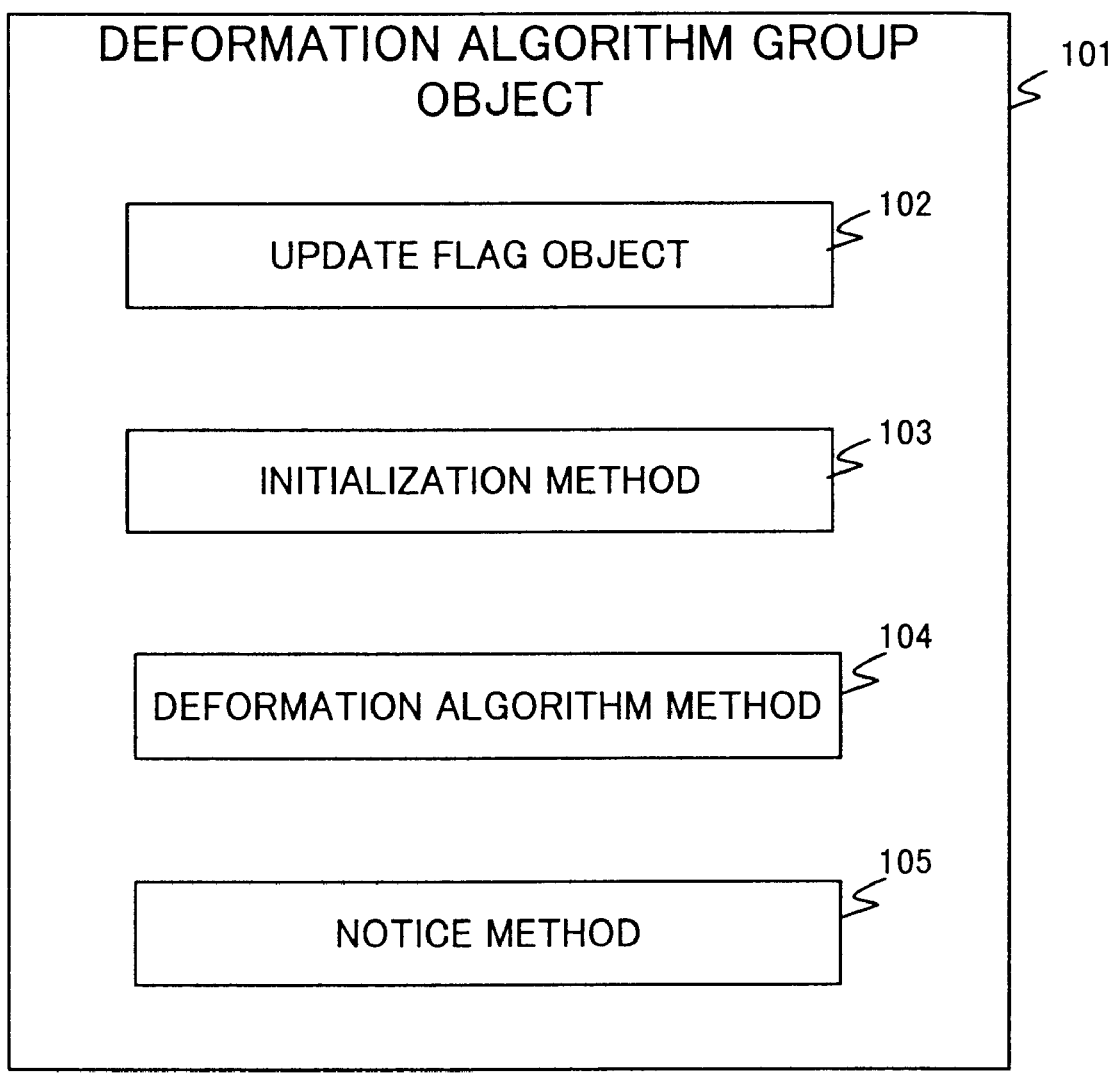
F I G. 9

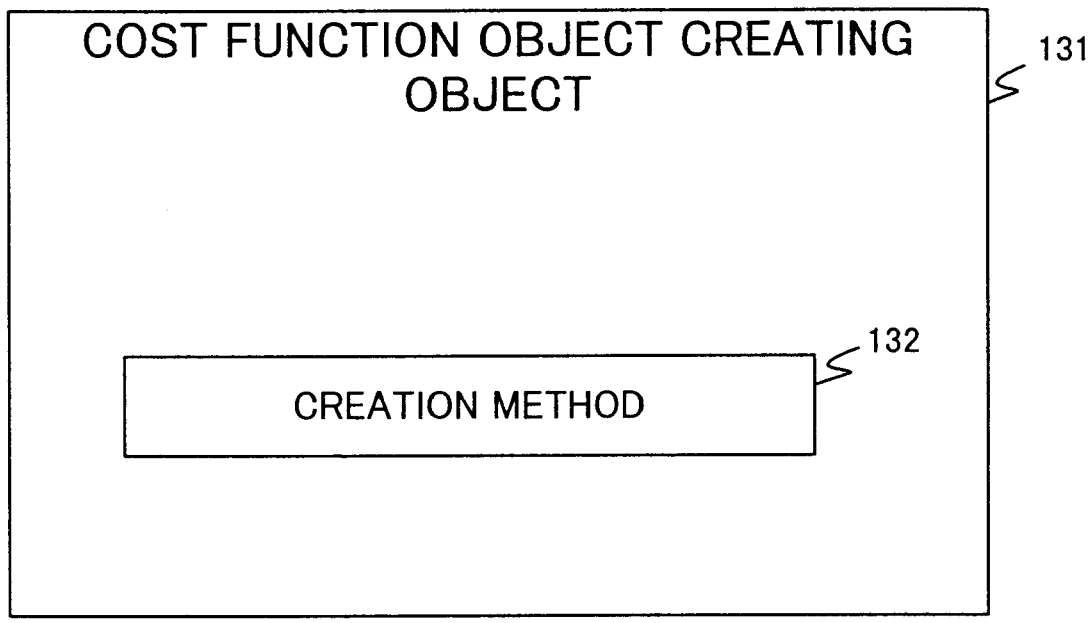
F I G. 12

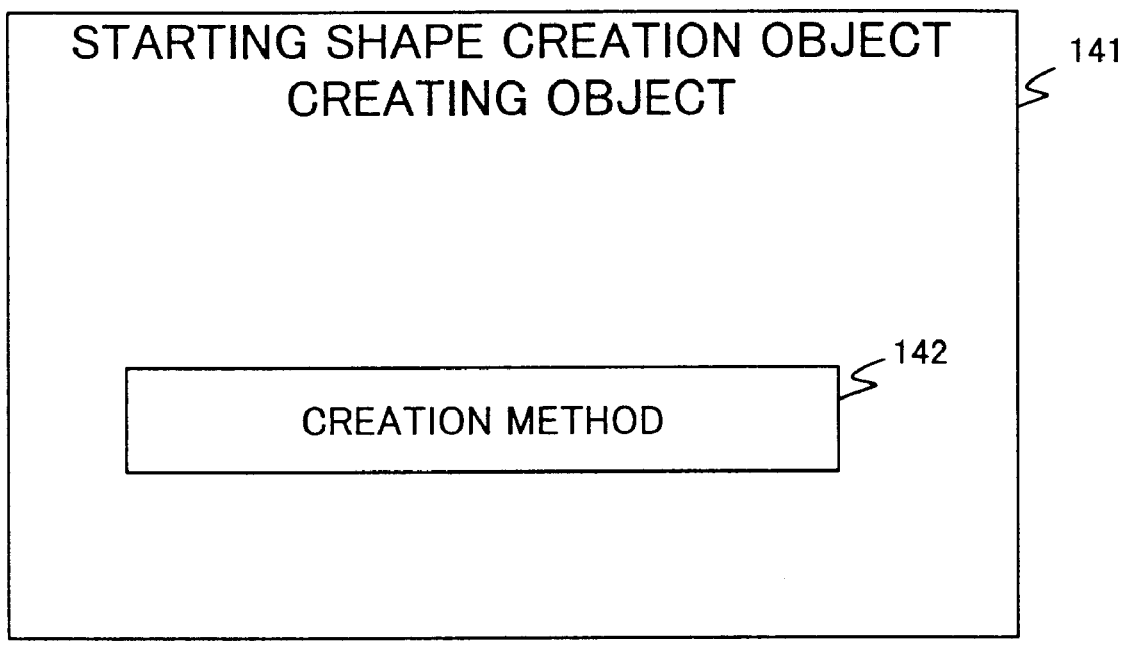
F I G. 13

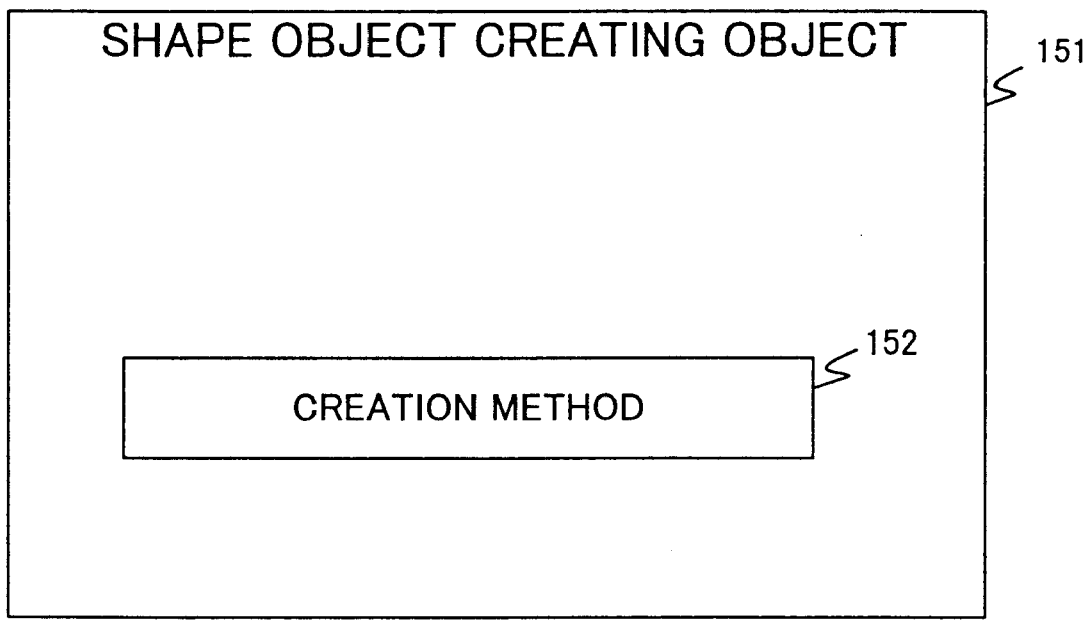
F I G. 14

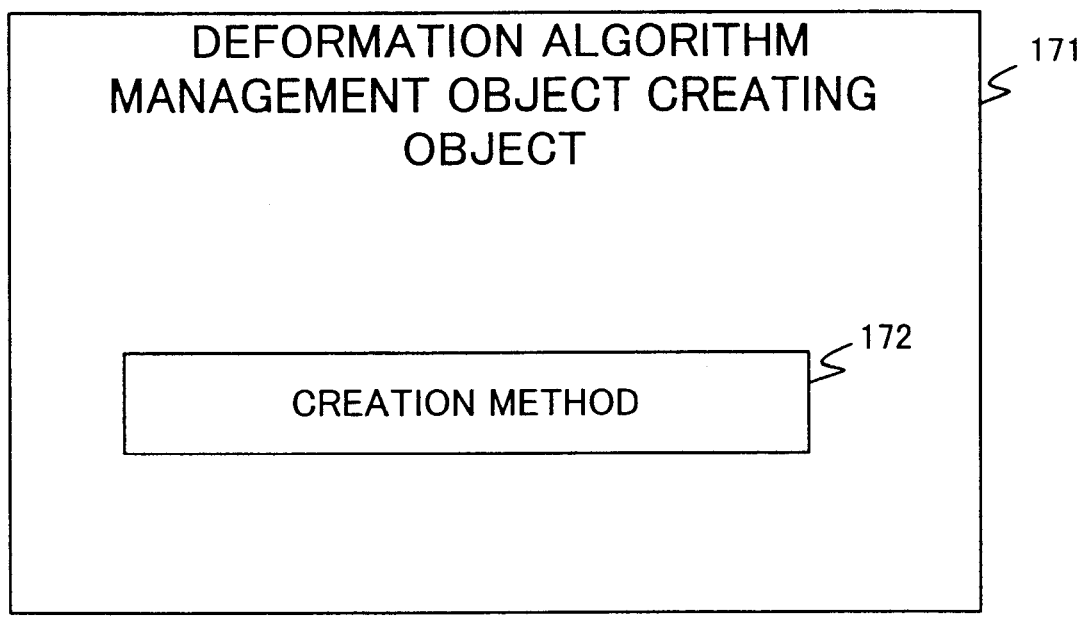
F I G. 16

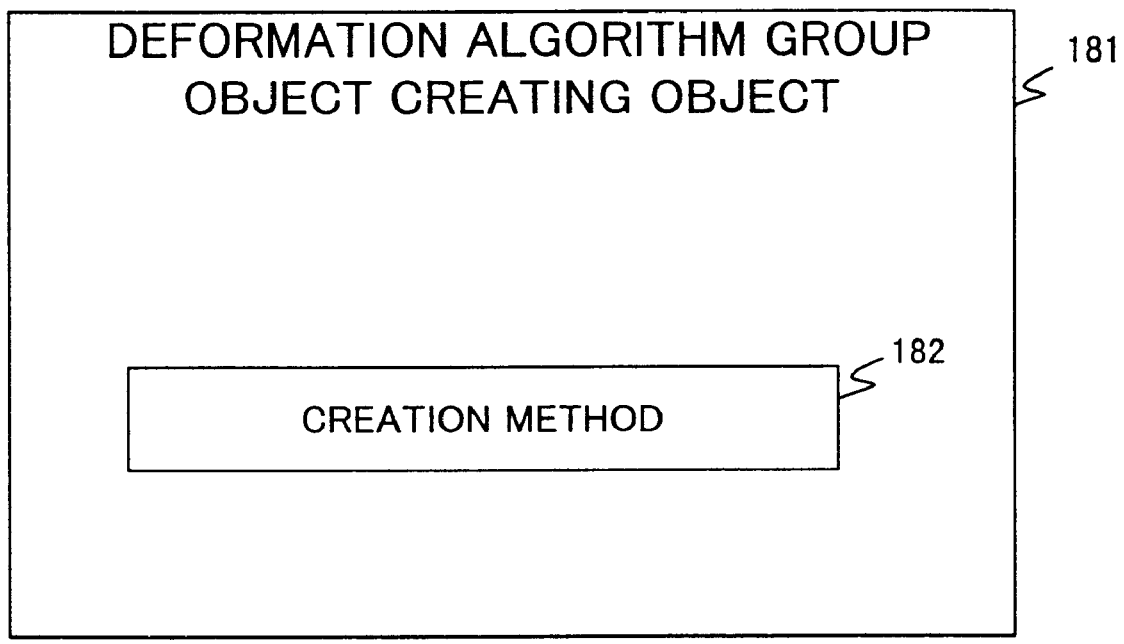
F I G. 17

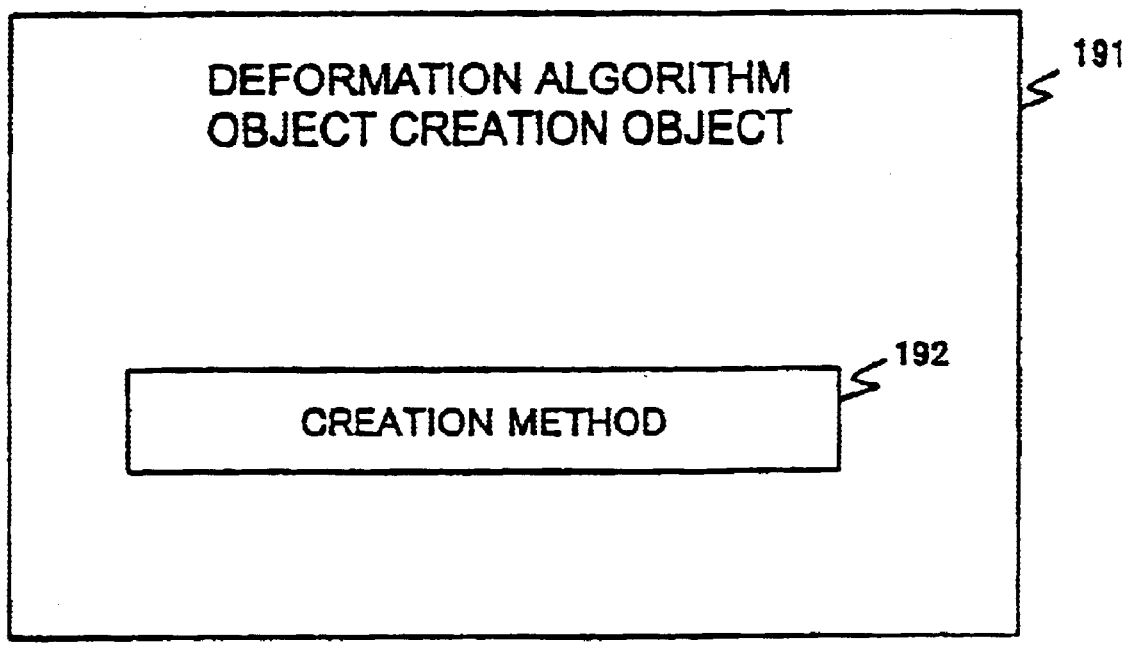
F I G. 18

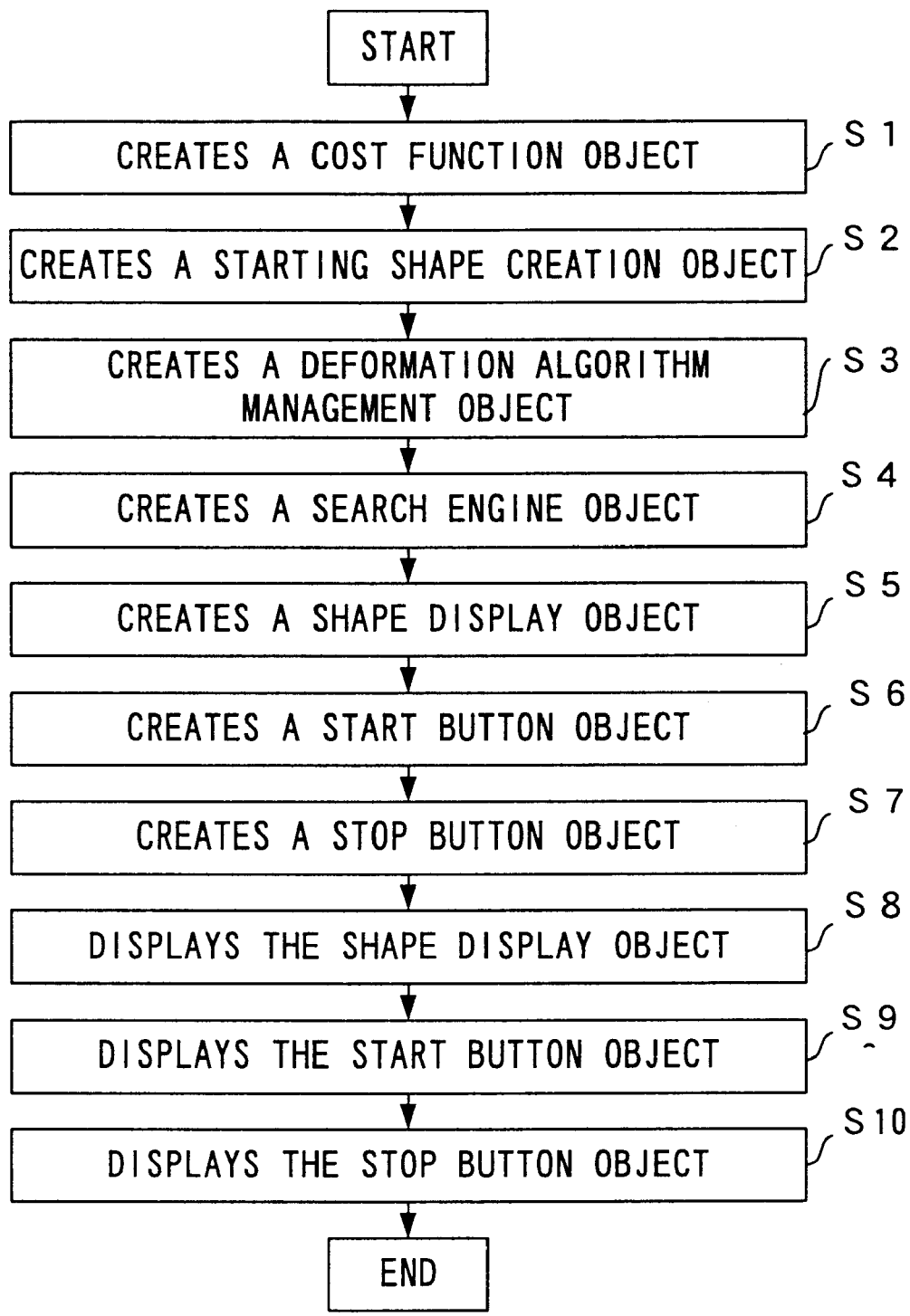
F I G. 2 0

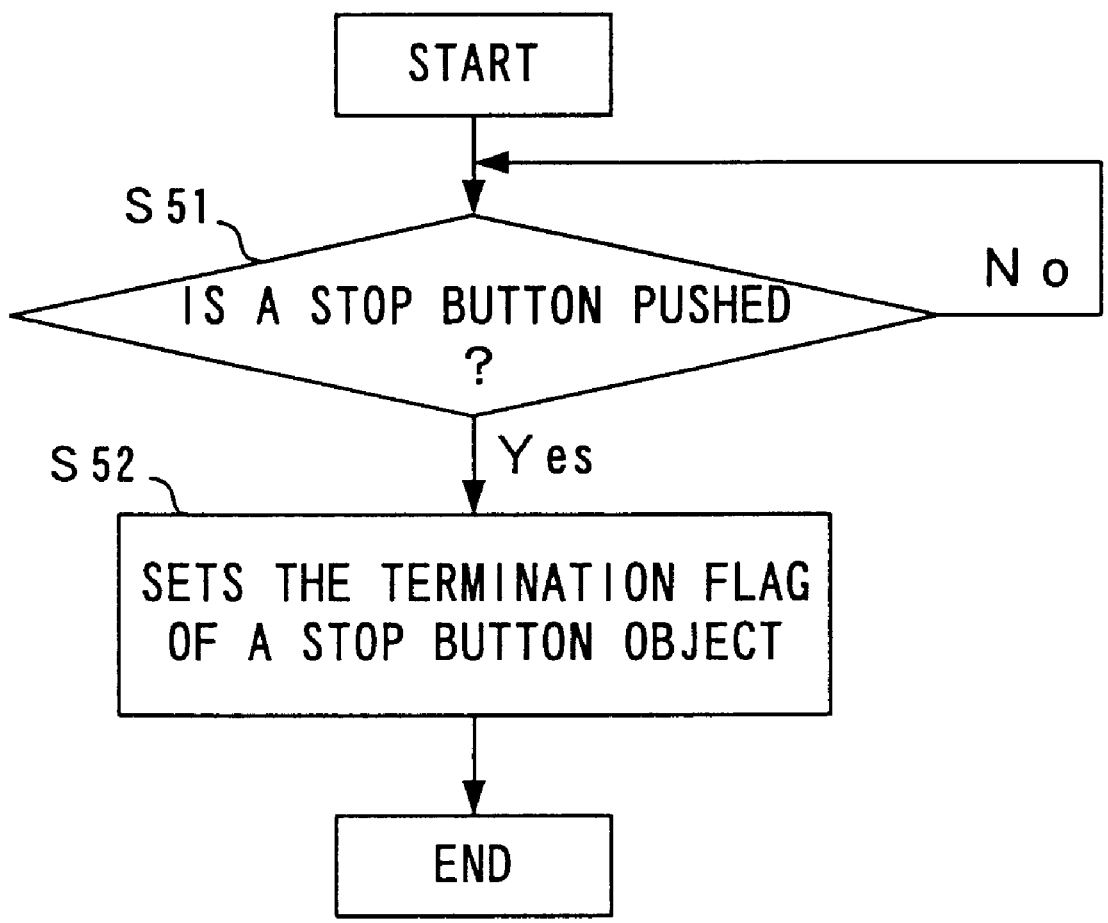
F I G. 2 4

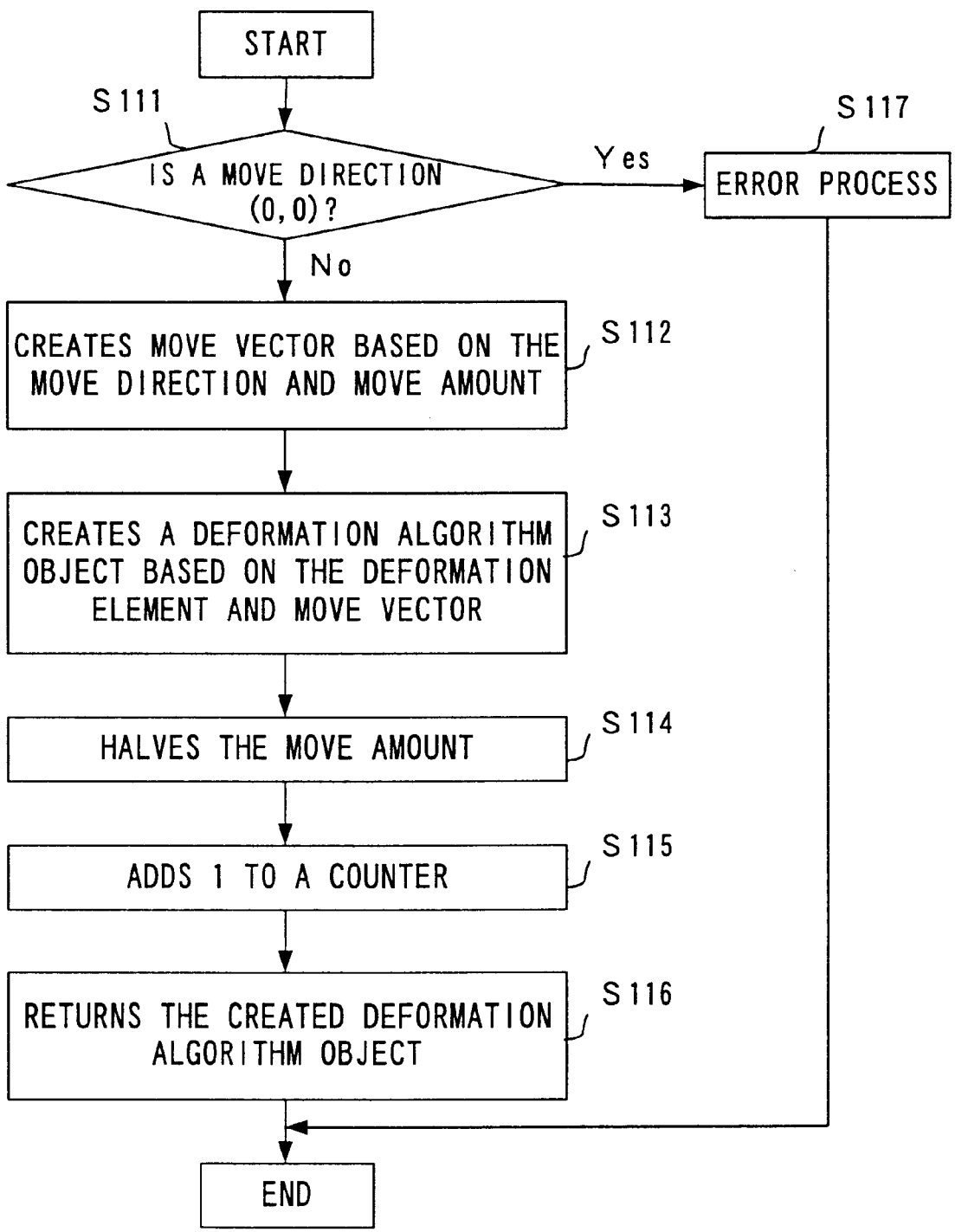
F I G. 3 0

PROCESSING APPARATUS AND METHOD FOR SOLVING OPTIMIZATION PROBLEM

BACKGROUND OF THE INVENTION

1. Field of the Invention

The present invention relates to a processing apparatus for solving optimization problems, such as an optimum structure problem, optimum allocation problem, optimum routing problem, etc., and a method thereof.

2. Description of the Related Art

Recently the solutions to optimization problems have been demanded in a variety of industrial fields. An optimization problem is a problem in which a search is made for a state where a given cost function becomes the maximum or minimum, or a local maximum or local minimum. A problem in which the maximum or a local maximum is searched for can be replaced with a problem in which a search is made for the minimum or a local minimum by changing the sign of a cost function. An optimization problem in which a search is made for the minimum or a local minimum is chiefly described below.

The optimization problem includes, for example, an optimum structure problem, optimum allocation problem, optimum routing problem, optimum network problem, optimum flow problem, optimum cost problem and optimum efficiency problem.

For example, an optimum structure problem is a problem in which a structure in the design of a building, bridge, wing of an airplane, etc., is optimized, and an optimum allocation problem is a problem in which the allocation of facilities in a city designing, the allocation of molecules in a compound, etc., is optimized. An optimum routing problem is a problem in which the routing is optimized in the navigation of vehicles, an electric circuit, etc.

For example, an optimum network problem is a problem in which the piping of gas and water, electric wiring, communications network, etc., is optimized, and an optimum flow problem is a problem in which a traffic flow on a road, a data flow on a network, etc., is optimized. An optimum cost problem and an optimum efficiency problem are problems in which the cost and efficiency in the fields of science, engineering, economy, business, etc., are optimized.

As conventional algorithms for solving such optimization problems, a steepest descent method, a genetic algorithm, a simulated annealing method, etc., are used.

However, the conventional optimization problem algorithms have the following problems.

Conventional information processing apparatuses for solving the optimization problems are roughly classified into two groups: one is the group of problem specifying apparatuses for handling only an individual problem and the other is the group of general-purpose apparatuses for handling a variety of problems. The problem specifying apparatus can be applied only to a specific problem and cannot handle problems other than the specific problem.

However, the general-purpose apparatus is considered to utilize one of the above-described algorithms. Since the steepest descent method presumes that a cost function is differentiable (smooth), the method cannot be applied to problems which are described using an undifferentiable cost function. Since the genetic algorithm has no neighborhood searching capability, the method cannot always be applied to a given problem appropriately. Since it is difficult to control a temperature parameter in the simulated annealing method, the method can hardly integrate a general-purpose parameter control.

SUMMARY OF THE INVENTION

The object of the present invention is to provide an easier-to-operate processing apparatus which covers a wider range of optimization problems and a method thereof.

In the first aspect of the present invention, a processing apparatus comprises a creation unit, a storage unit, a deformation unit and an output unit.

The creation unit creates a shape model representing a given problem, and the storage unit stores data on the shape model. The deformation unit deforms the shape model, and the output unit visually outputs the deformed shape model.

In the second aspect of the present invention, a processing apparatus comprises a search unit, a designation unit and an output unit.

The search unit creates a shape model representing a given problem using one or more deformation elements, deforms the shape model while changing the deformation elements, and searches for a solution so as to improve the cost value of the shape model. The designation unit designates a search termination condition for each deformation element, an overall search termination condition, a process sequence of deformation elements, a cost function and a deformation algorithm for deformation elements, and the output unit visually outputs the deformed shape model.

BRIEF DESCRIPTION OF THE DRAWINGS

FIG. 3 shows the configuration of a search engine object.

FIG. 4 shows the configuration of a start button object.

FIG. 5 shows the configuration of a stop button object.

FIG. 8 shows the configuration of a deformation algorithm management object.

FIG. 9 shows the configuration of a deformation algorithm group object.

FIG. 12 shows the configuration of a cost function object creating object.

FIG. 13 shows the configuration of a starting shape creation object creating object.

FIG. 14 shows the configuration of a shape object creating object.

FIG. 16 shows the configuration of a deformation algorithm management object creating object.

FIG. 17 shows the configuration of a deformation algorithm group object creating object.

FIG. 18 shows the configuration of a deformation algorithm object creating object.

FIG. 20 is a flowchart showing the process of a start program.

FIG. 24 is a flowchart showing the process of a stop method.

FIG. 30 is a flowchart showing the process of the first deformation algorithm method.

DESCRIPTION OF THE PREFERRED EMBODIMENTS

The detailed preferred embodiments of the present invention are described below with reference to the drawings.

Figure 1:
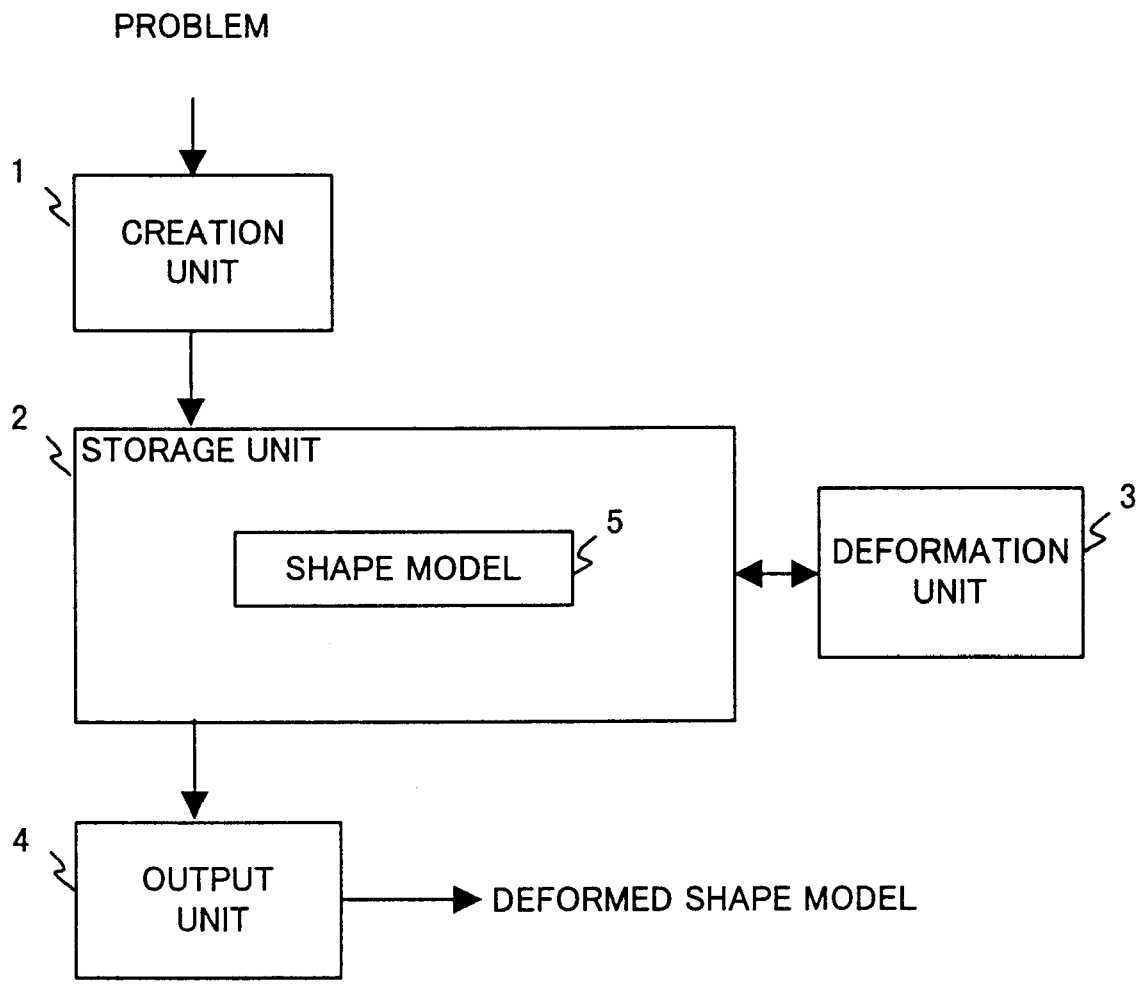
FIG. 1 shows the principle of the processing apparatus of the present invention.

FIG. 1 shows the principle of the processing apparatus of the present invention. The processing apparatus shown in FIG. 1 comprises a creation unit 1, a storage unit 2, a deformation unit 3 and an output unit 4.

The creation unit 1 creates a shape model representing a given problem, and the storage unit 2 stores data on the shape model 5. The deformation unit 3 deforms the shape model 5, and the output unit 4 visually outputs the deformed shape model.

The shape model 5 is created, for example, as an aggregate of points, lines and planes in n-dimensional space, and the storage unit 2 stores data on those points, lines and surfaces. The deformation unit 3 deforms the shape model 5 based on the points, lines and surfaces included in the shape model 5, and the output unit 4 displays the deformed shape model on a display screen, etc., and presents the deformation process to a user.

If an optimization problem is transformed into a shape model in this way, the shape model can be widely utilized for many problems. A shape deformation algorithm has an advantage of being simple and easy to understand. An optimum solution can be automatically obtained from a shape model 5 in which a cost value is the best or the local best, and if a user can estimate the cost value from the displayed shape, the solution can also be extracted at a proper timing. The fact that a cost value is the best or the local best includes both a case where the cost value is the minimum or a local minimum and a case where the cost value is the maximum or a local maximum.

For example, the creation unit 1, storage unit 2, deformation unit 3 and output unit 4 shown in FIG. 1 correspond to the search engine 11 shown in FIG. 2, which is described later, and the shape model 5 shown in FIG. 1 corresponds to the shape 21 shown in FIG. 2.

Since the processing apparatus of the present invention is comprised of common components and individual components, a processing apparatus suited to another problem can be easily configured by replacing the individual components. Since the tuning of the individual components can also be easily performed, the process efficiency can be improved depending on a given problem.

Figure 2:
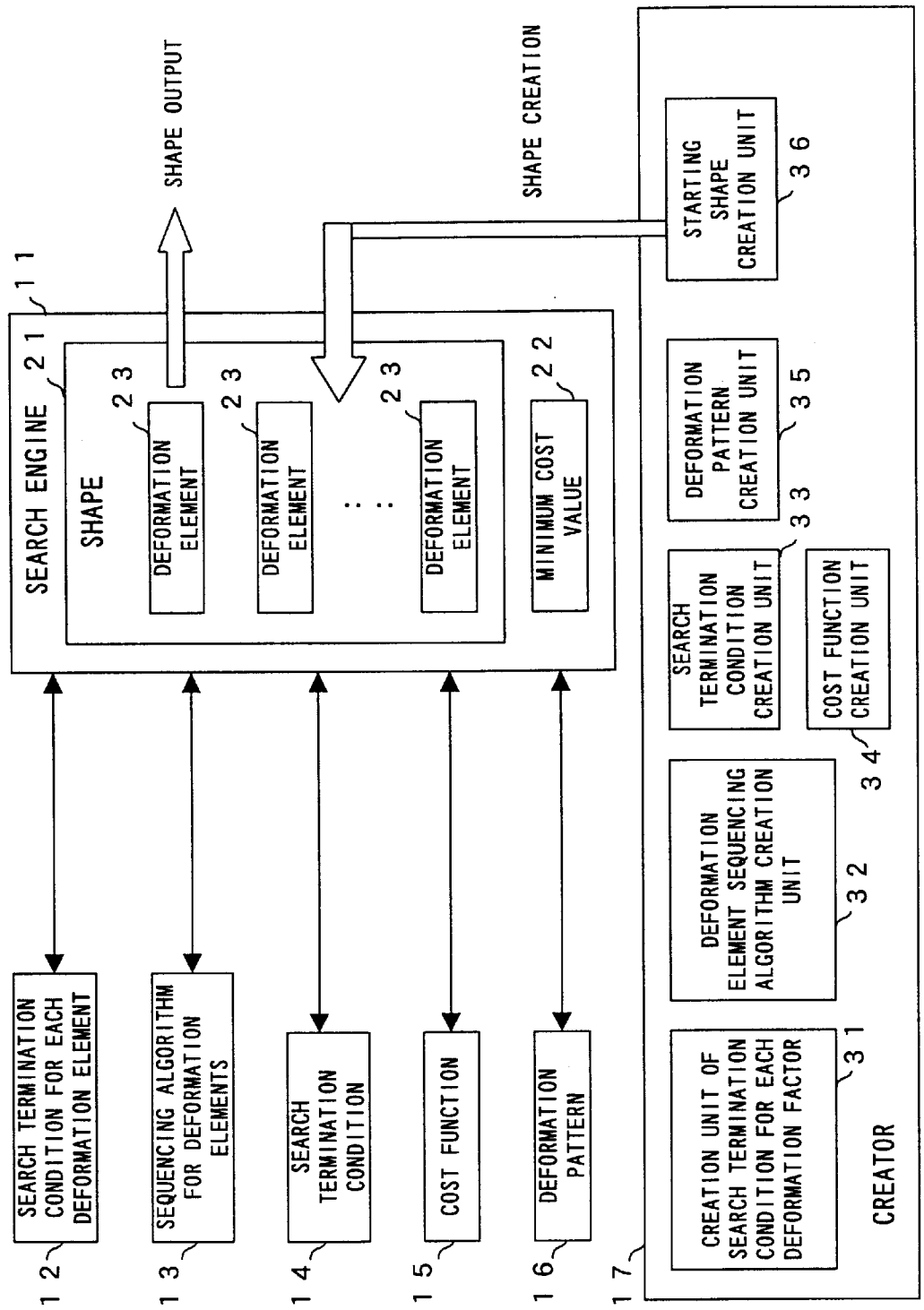
FIG. 2 shows the configuration of the processing apparatus.

FIG. 2 shows the configuration of the processing apparatus of this preferred embodiment. The processing apparatus shown in FIG. 2 comprises a search engine 11, a search termination condition for each deformation element 12, a sequencing algorithm for each deformation element 13, a search termination condition 14, a cost function 15, a deformation pattern 16 and a creator 17.

The search engine 11 stores both data on a shape 21 obtained by modeling an optimization problem and a minimum cost value 22 in the search process for a solution, and the shape 21 includes data on one or more deformation elements 23. The creator 17 includes creation units 31, 32, 33, 34, 35 and 36, and creates necessary information at the request of the search engine 11.

The search engine 11 corresponds to a common component, and the search termination condition for each deformation element 12, sequencing algorithm for each deformation element 13, search termination condition 14, cost function 15, deformation pattern 16, shape 21, deformation elements 23 and creation units 31 through 36 correspond to the individual components which can be replaced depending on a problem.

The search engine 11 first converts a problem into a shape model using a starting shape creation unit 36 according to a user's instruction. Here, the final target is expressed as a shape 21, such as an oriented or disoriented simplicial complex (for example, a polygon or polyhedron).

For example, as a space representing a polygon, a plane surface (two-dimensional space) or a solid space (three-dimensional space) can be used. As a space representing the shape 21, not only an n-dimensional manifold (straight line, plane surface, solid, sphere, torus, etc.), but also a simplicial complex including a graph (one-dimensional complex) can be used.

Then, the search engine 11 expresses the original cost function of a given problem as a cost function 15 of the shape 21 and expresses the original restriction condition as a restriction condition on the expression method of the shape 21 using a cost function creation unit 34. Then, the search engine 11 searches for a solution while deforming the shape 21 according to a predetermined algorithm, and outputs a shape in which the value of the cost function 15 is the minimum, as the solution.

However, when using such a processing apparatus, a user has to determine the following six items.

(1) Deformation element 23

When deforming a shape 21, the user determines the elements (simplexes) of the shape 21, based on which a deformation is performed. For example, points, lines, surfaces, solids, etc., included in the shape 21 are adopted as deformation elements 23. A deformation based on an element is a deformation operation using the element as a parameter, and for example, the following deformations can be considered.

Assuming that the shape 21 is a polygon and that the vertexes of the polygon are elements, the shape 21 is deformed while shifting the positions of the elements.

Assuming that the shape 21 is a tree on a plane and that the nodes (points) of the tree are elements, a new node is added to an appropriate position of the tree and a tree obtained by connecting the original element and the new node is regarded as the deformed shape of the original tree.

(2) Deformation pattern 16

The user selects a plurality of specific operations from deformation operations based on the deformation elements 23, and sequences the operations using a deformation pattern creation unit 35. For example, if a shape 21 is expressed as a polygon on an xy plane and the vertexes of the polygon are deformation elements 23, the following deformation pattern 16 can be defined using an appropriate length h.

[Deformation 1] Shape Deformation by Moving a Vertex by the Length h in the Positive Direction of the x Axis

[Deformation 2] Shape Deformation by Moving a Vertex by the Length h in the Positive Direction of the y Axis

[Deformation 3] Shape Deformation by Moving a Vertex by the Length h in the Negative Direction of the x Axis

[Deformation 4] Shape Deformation by Moving a Vertex by the Length h in the Negative Direction of the y Axis Here, the sequenced four deformation operations with a vertex as a key, which are [Deformation 1] through [Deformation 4], indicate one deformation pattern.

(3) Search Starting Shape

The user determines the initial shape of a shape 21 using a starting shape creation unit 36. For example, if the shape 21 is a pentagon on a plane, the user appropriately locates five points on the plane, and designates a pentagon obtained by connecting those points in an appropriate sequence as a starting shape.

(4) Search Termination Condition 14

The user determines a search termination condition 14 using a search termination condition creation unit 33. As the search termination condition 14, the following conditions can be used.

If the minimum cost value 22 of the shape 21 becomes less than a predetermined value, the search is terminated.

If the damping rate of the shape cost function 15 becomes less than a predetermined value, the search is terminated.

If the number of search operations exceeds a predetermined value, the search is terminated.

If the number of times that the value of a cost function 15 descends exceeds a predetermined value, the search is terminated.

If a search time exceeds a predetermined value, the search is terminated.

If there is a user's instruction to terminate, the search is terminated.

(5) Deformation Element Sequencing Algorithm 13

The user determines a sequencing algorithm for sequencing the deformation elements 23 of a shape 21 using a deformation element sequencing algorithm creation unit 32. For example, a sequencing algorithm for sequencing the deformation elements 23 using a random number generator can be considered.

(6) Search Termination Condition for Each Deformation Element 12

The user determines a search termination condition for each deformation element 12 using a search termination condition creation unit for each deformation element 31. As the search termination condition 12, for example, the following conditions can be considered.

If a deformation pattern 16 consists of a finite number of deformation operations, the search is terminated after all the deformation operations are performed.

If the number of search operations exceeds a predetermined value or the deformation operations of the deformation pattern 16 are completed, the search is terminated.

If the number of times that the value of a cost function 15 descends exceeds a predetermined value or the deformation operations of the deformation pattern 16 are completed, the search is terminated.

If there is a user's instruction to terminate or the deformation operations of the deformation pattern 16 are completed, the search is terminated.

The processing apparatus shown in FIG. 2 does not presume the differentiability of a cost function which the steepest descent method presumes, and has a neighborhood search capability which the genetic algorithm does not have. Furthermore, the processing apparatus requires no parameter control which the simulated annealing method requires. Therefore, the processing apparatus has both rich versatility and high operability.

Although this processing apparatus can be realized using hardware or software, the configuration in the case where an object-oriented is utilized is described as an example here. The objects used in this embodiment are categorized into a common object, an interface common object, a cost function object and an object factory. An object usually has both data and a procedure (method) for the data, and can also have link relation with another object.

The common object is independent of an individual problem, and is commonly used for all problems. The common object is designed taking into consideration only a common method interface, and the operation logic of a method is not taken into consideration. The common object includes the following objects.

(1) Search engine object (2) Start button object (3) Stop button object

Although the interface common object has a common method interface independent of an individual problem, the operation logic of the method is dependent on an individual problem. The interface common object includes the following objects.

(4) Cost function object
(5) Starting shape creation object
(6) Shape object
(7) Deformation element object
(8) Deformation algorithm management object
(9) Deformation algorithm group object
(10) Deformation algorithm object
(11) Shape display object The object factory creates the interface common object. The processing apparatus can be adapted to an individual problem by customizing the object group of the object factory. The object factory includes the following objects.

(12) Cost function object creating object
(13) Starting shape creation object creating object
(14) Shape object creating object
(15) Deformation element object creating object
(16) Deformation algorithm management object creating object
(17) Deformation algorithm group object creating object
(18) Deformation algorithm object creating object
(19) Shape display object creating object Next, the data and method possessed by each object are described with reference to FIGS. 3 through 24. FIG. 3 shows the configuration of a search engine object. The search engine object 41 shown in FIG. 3 corresponds to the search engine 11 shown in FIG. 2, and has a shape object 42, a cost value object 43 and a search method 44.

The shape object 42 and cost value object 43 correspond to the shape 21 and minimum cost value 22, respectively, shown in FIG. 2, and have data to be used by the search engine object 41. The deformation element object 45 corresponds to the deformation element 23 shown in FIG. 2, and is linked with the shape object 42. The search method 44 activates a process corresponding to the search engine 11.

FIG. 4 shows the configuration of a start button object. The start button object 51 shown in FIG. 4 has both a timing flag object 52 and a start method 53, and detects the operation of a search engine start button displayed on a display screen. The timing flag object 52 has a flag for indicating a timing for displaying the data of the shape object 42, and the start method 53 activates the search engine object 41 based on a button-pushing event.

FIG. 5 shows the configuration of a stop button object. The stop button object 61 shown in FIG. 5 has both a termination flag object 62 and a stop method 63, and detects the operation of a search engine stop button displayed on a display screen. The termination flag object 62 has a flag for indicating the termination timing of a search process executed by the search engine object 41, and the stop method 63 stops the search engine object 41 based on a button-pushing event.

Figure 6:
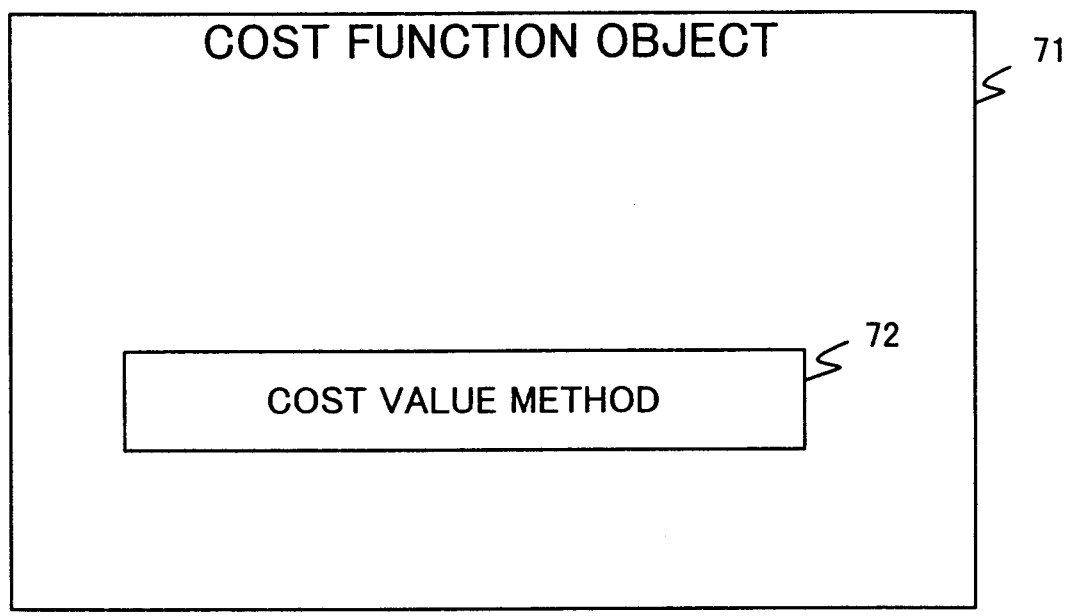
FIG. 6 shows the configuration of a cost function object.
Figure 7:
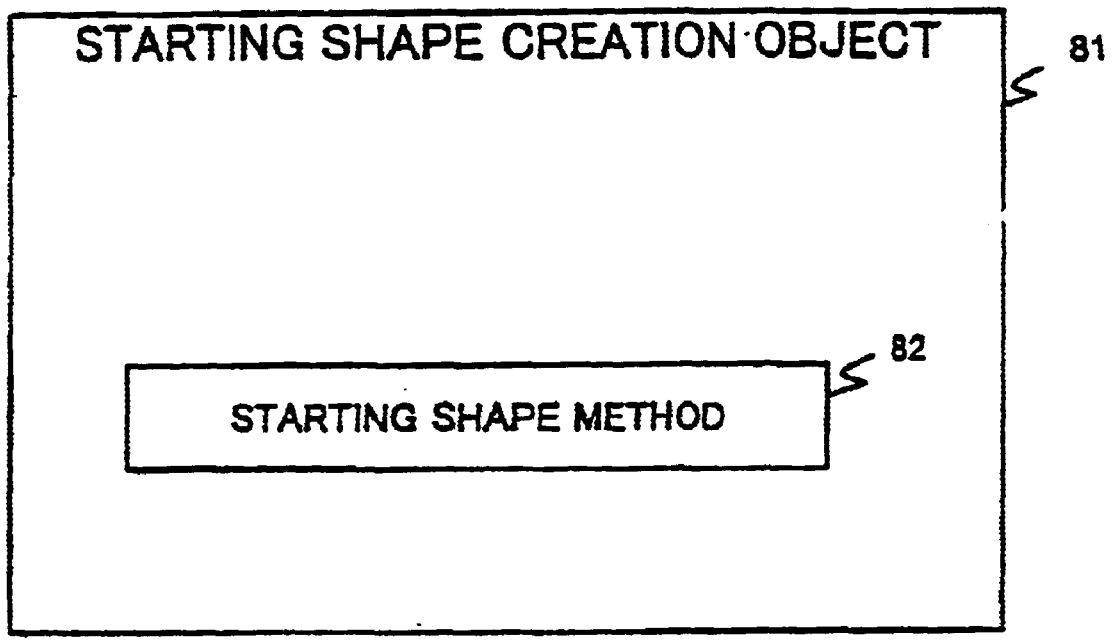
FIG. 7 shows the configuration of a starting shape creation object.

FIG. 6 shows the configuration of a cost function object. The cost function object 71 shown in FIG. 6 corresponds to the cost function 15 shown in FIG. 2, and has a cost value method 72 for returning the cost value of a given shape. FIG. 7 shows the configuration of a starting shape creation object. The starting shape creation object 81 shown in FIG. 7 has a starting shape method 82, and detects the operation of a starting shape creation button displayed on a display screen. The starting shape method 82 creates a starting shape based on a button-pushing event.

FIG. 8 shows the configuration of a deformation algorithm management object. The deformation algorithm management object 91 shown in FIG. 8 corresponds to the deformation element sequencing algorithm 13 shown in FIG. 2, and has an initialization method 92, a deformation element method 93 and a notice method 94. The initialization method 92 initializes the deformation algorithm management object 91, and the deformation element method 93 obtains a deformation element object 45 to be processed next. The notice method 94 reports whether the next deformation element object 45 exists.

FIG. 9 shows the configuration of a deformation algorithm group object. The deformation algorithm group object 101 shown in FIG. 9 corresponds to the deformation pattern 16 shown in FIG. 2, and has an update flag object 102, an initialization method 103, a deformation algorithm method 104 and a notice method 105. The initialization method 103 initializes the deformation algorithm group object 101 for each deformation element object 45, and the deformation algorithm method 104 obtains a deformation algorithm object to be processed next. The notice method 105 reports whether the next deformation algorithm object exists.

Figure 10:
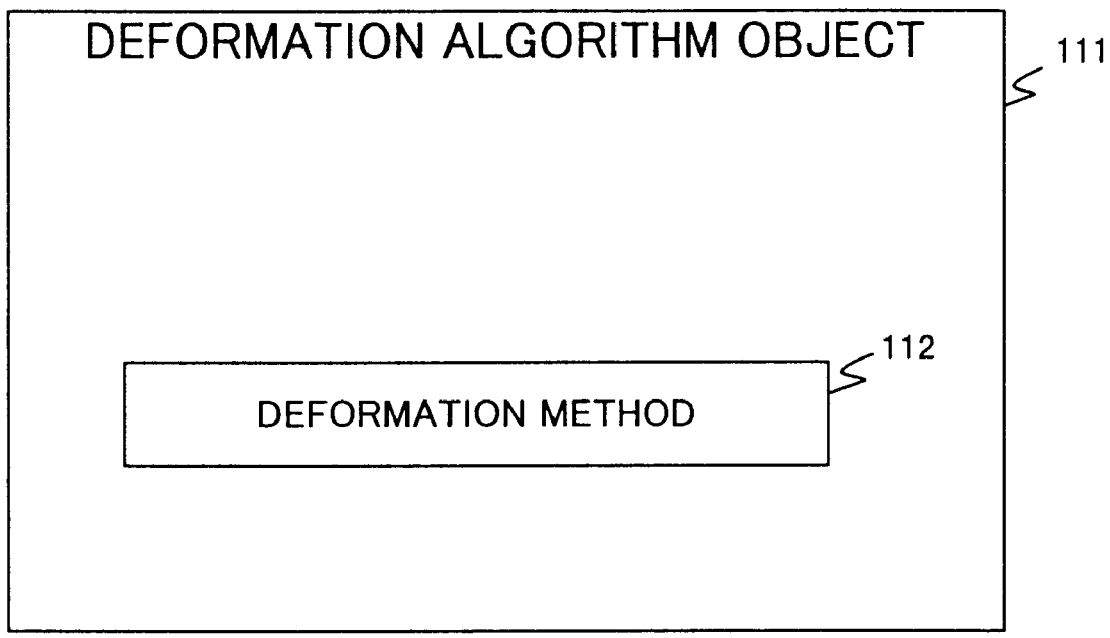
FIG. 10 shows the configuration of a deformation algorithm object.
Figure 11:
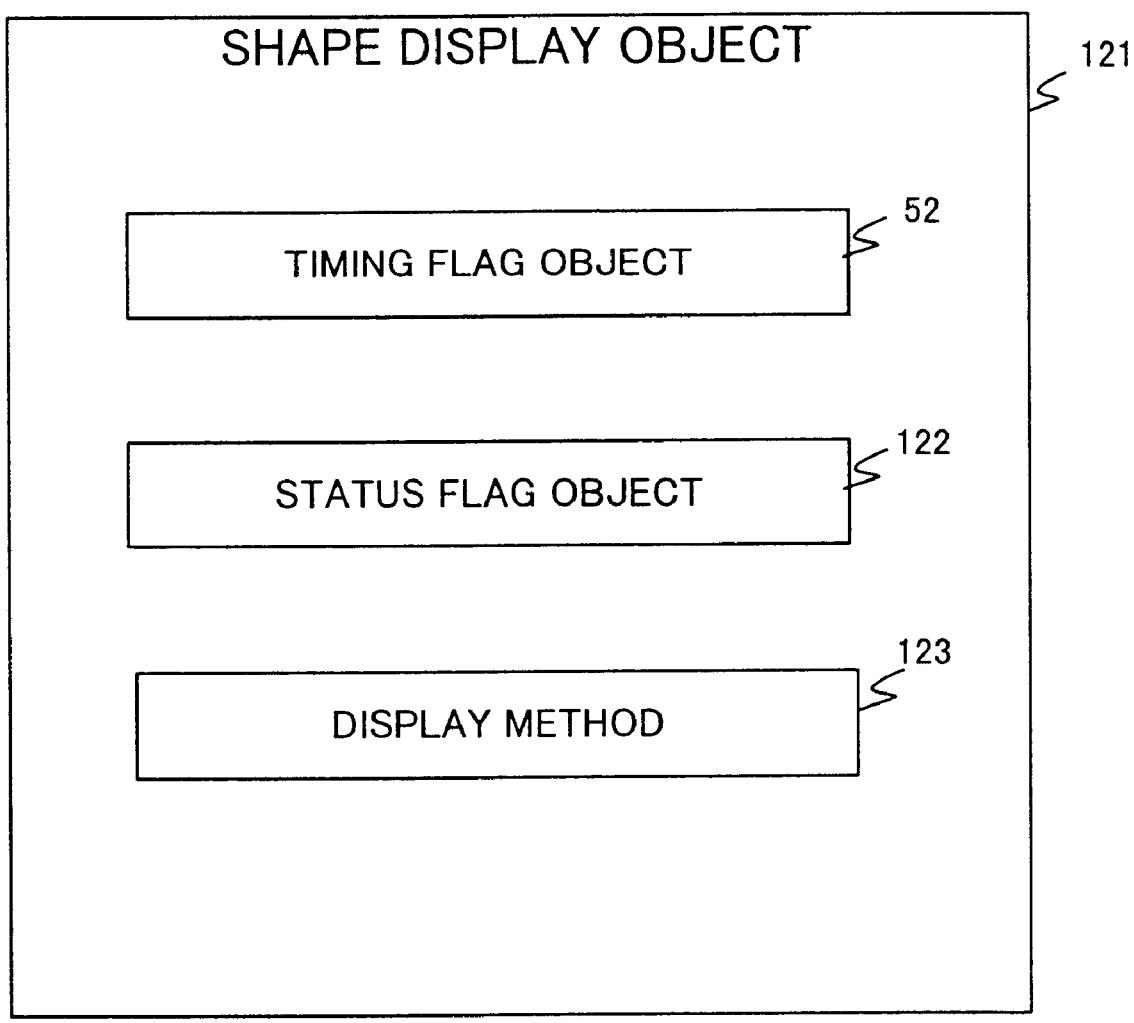
FIG. 11 shows the configuration of a shape display object.

FIG. 10 shows the configuration of a deformation algorithm object. The deformation algorithm object 111 shown in FIG. 10 has a deformation method 112 for returning the deformed shape of a given shape. FIG. 11 shows the configuration of a shape display object. The shape display object 121 shown in FIG. 11 has the timing flag object 52 shown in FIG. 4, a status flag object 122 and a display method 123. The display method 123 displays the given shape on a display screen.

FIG. 12 shows the configuration of a cost function object creating object. The cost function object creating object 131 shown in FIG. 12 corresponds to the cost function creation unit 34 shown in FIG. 2, and has a creation method 132 for creating a cost function object 71 corresponding to a given problem.

FIG. 13 shows the configuration of a starting shape creation object creating object. The starting shape creation object creating object 141 shown in FIG. 13 corresponds to the starting shape creation unit 36 shown in FIG. 2, and has a creation method 142 for creating a starting shape creation object 81 corresponding to a given problem.

Figure 15:
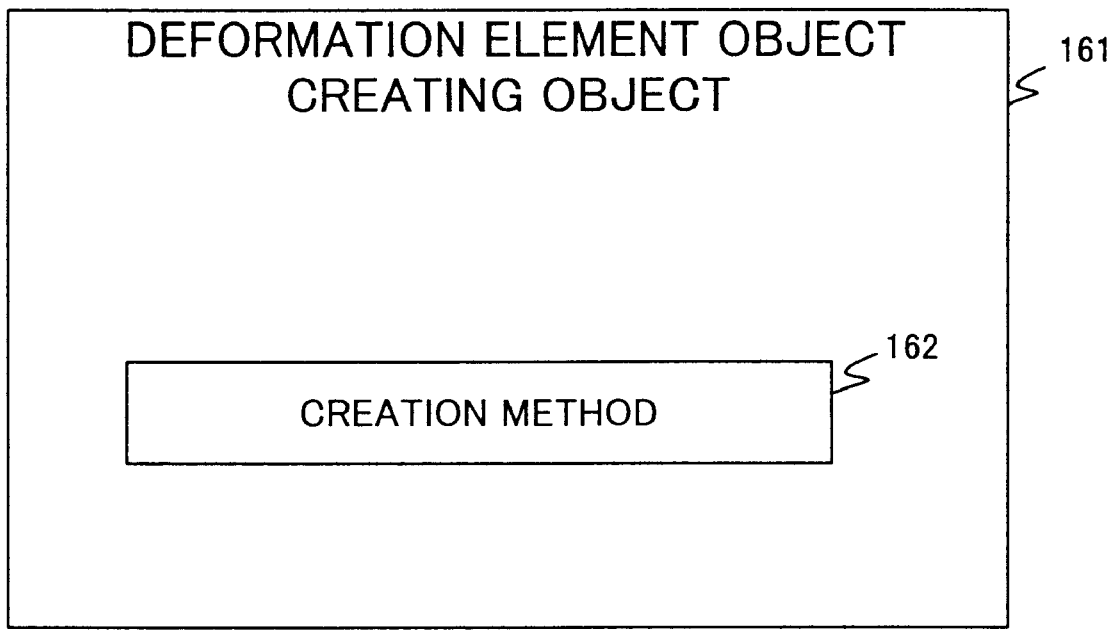
FIG. 15 shows the configuration of a deformation element object creating object.

FIG. 14 shows the configuration of a shape object creating object. The shape object creating object 151 shown in FIG. 14 has a creation method 152 for creating a shape object 42 corresponding to a given problem. FIG. 15 shows the configuration of a deformation element object creating object. The deformation element object creating object 161 shown in FIG. 15 has a creation method 162 for creating a deformation element object 45 corresponding to a given problem.

FIG. 16 shows the configuration of a deformation algorithm management object creating object. The deformation algorithm management object creating object 171 shown in FIG. 16 corresponds to the deformation element sequencing algorithm creation unit 32 shown in FIG. 2, and has a creation method 172 for creating a deformation algorithm management object 91 corresponding to a given problem.

FIG. 17 shows the configuration of a deformation algorithm group object creating object. The deformation algorithm group object creating object 181 shown in FIG. 17 corresponds to the deformation pattern creation unit 35 shown in FIG. 2, and has a creation method 182 for creating a deformation algorithm group object 101 corresponding to a given problem. FIG. 18 shows the configuration of a deformation algorithm object creating object. The deformation algorithm object creating object 191 shown in FIG. 18 has a creation method 192 for creating a deformation algorithm object 111 corresponding to a given problem.

Figure 19:
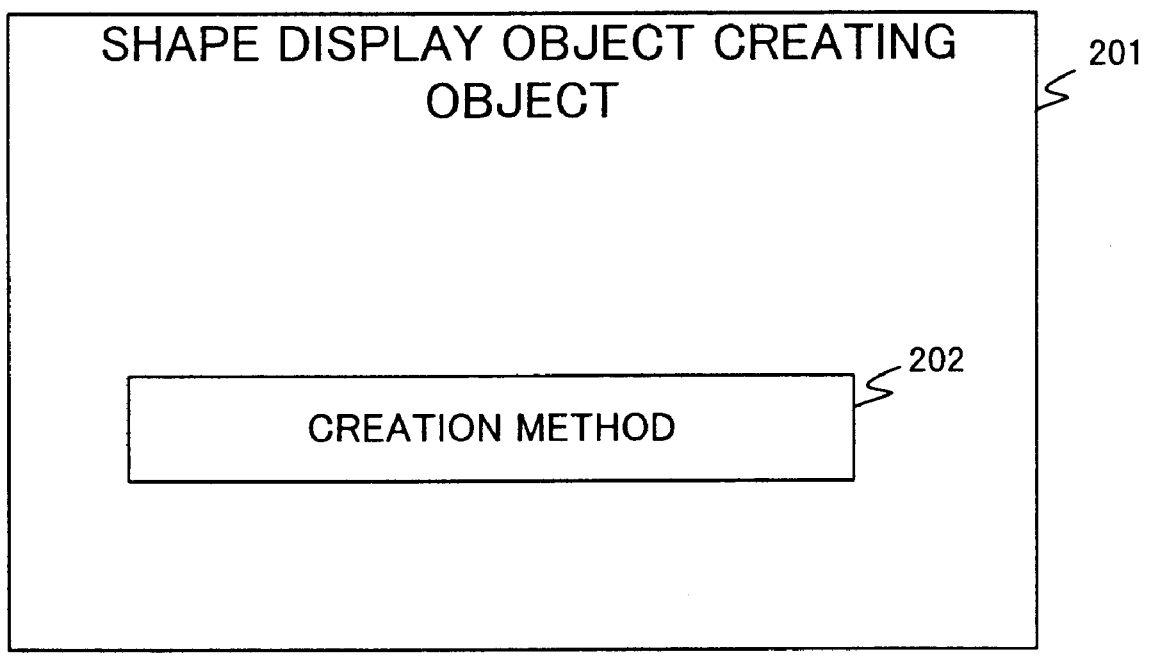
FIG. 19 shows the configuration of a shape display object creating object.

FIG. 19 shows the configuration of a shape display object creating object. The shape display object creating object 201 shown in FIG. 19 has a creation method 202 for creating a shape display object 121 corresponding to a given problem.

In addition to the objects described above, the respective objects corresponding to the search termination condition for each deformation element 12, search termination condition 14, search termination condition creation unit for each deformation element 31 and search termination condition creation unit 33 shown in FIG. 2 can be provided to control these search termination conditions.

Next, the processes executed by the common objects are described in further detail. Here, if all deformation operations according to a deformation algorithm which is managed by the deformation algorithm group object 101 are completed, a search for one deformation element is terminated, and if a user pushes a stop button on a screen using a mouse, etc., all searches are terminated.

FIG. 20 is a flowchart showing the process of a start program for starting a system. The start program first activates a cost function object creating object 131, and creates a cost function object 71 (step S1). Then, the start program activates a starting shape creation object creating object 141, and creates a starting shape creation object 81 (step S2). Then, the start program activates a deformation algorithm management object creating object 171, and creates a deformation algorithm management object 91 (step S3).

Then, the start program creates a search engine object 41 (step S4), and creates a shape display object 121 (step S5). Then, the start program creates a start button object 51 (step S6) and creates a stop button object 61 (step S7).

Then, the start program displays a display area corresponding to the shape display object 121 (step S8), displays a start button corresponding to the start button object 51 (step S9), displays a stop button corresponding to the stop button object 61 (step S10) and terminates the process.

Figure 21:
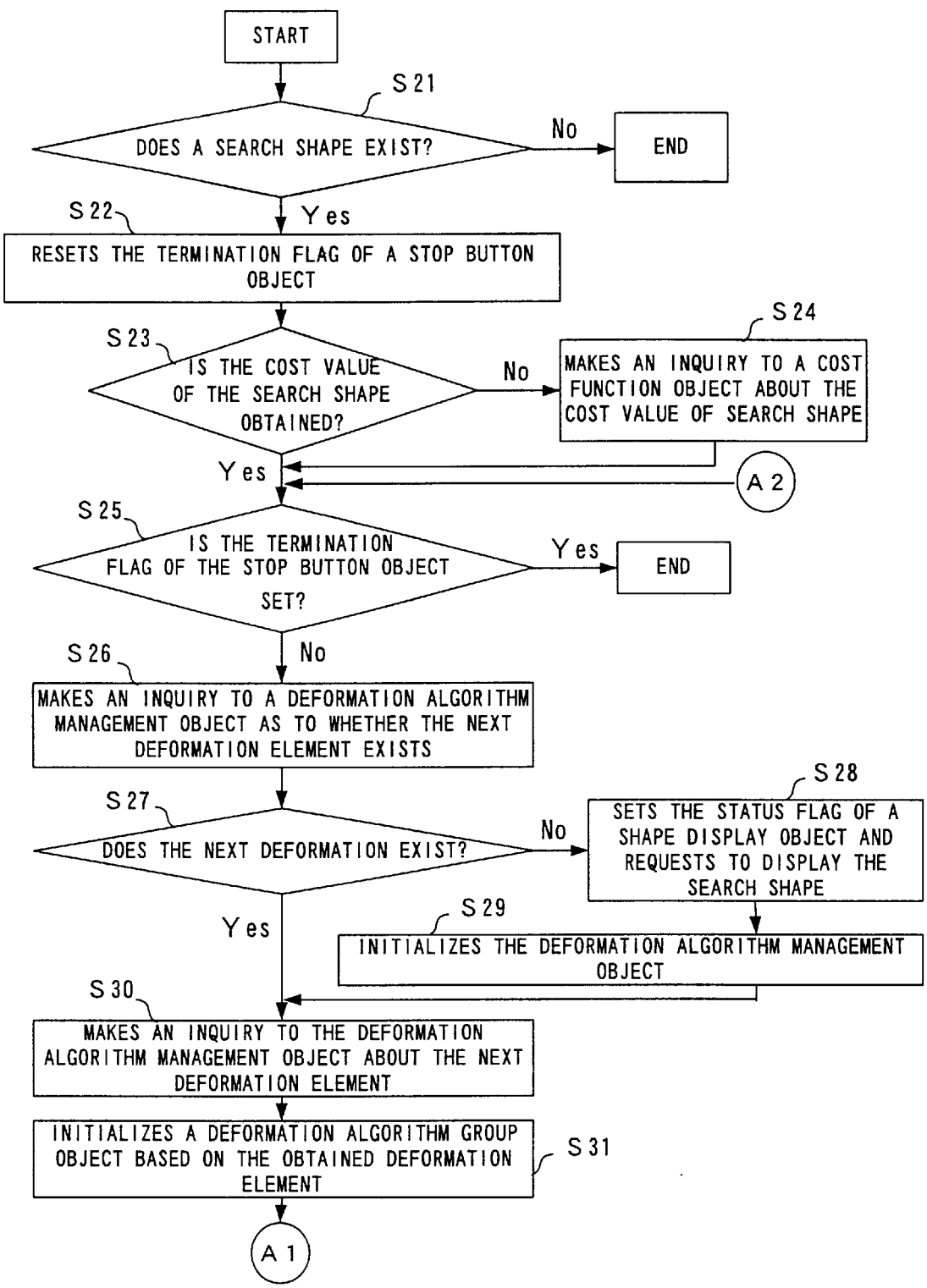
FIG. 21 is a flowchart showing the process of a search method (No.1).
Figure 22:
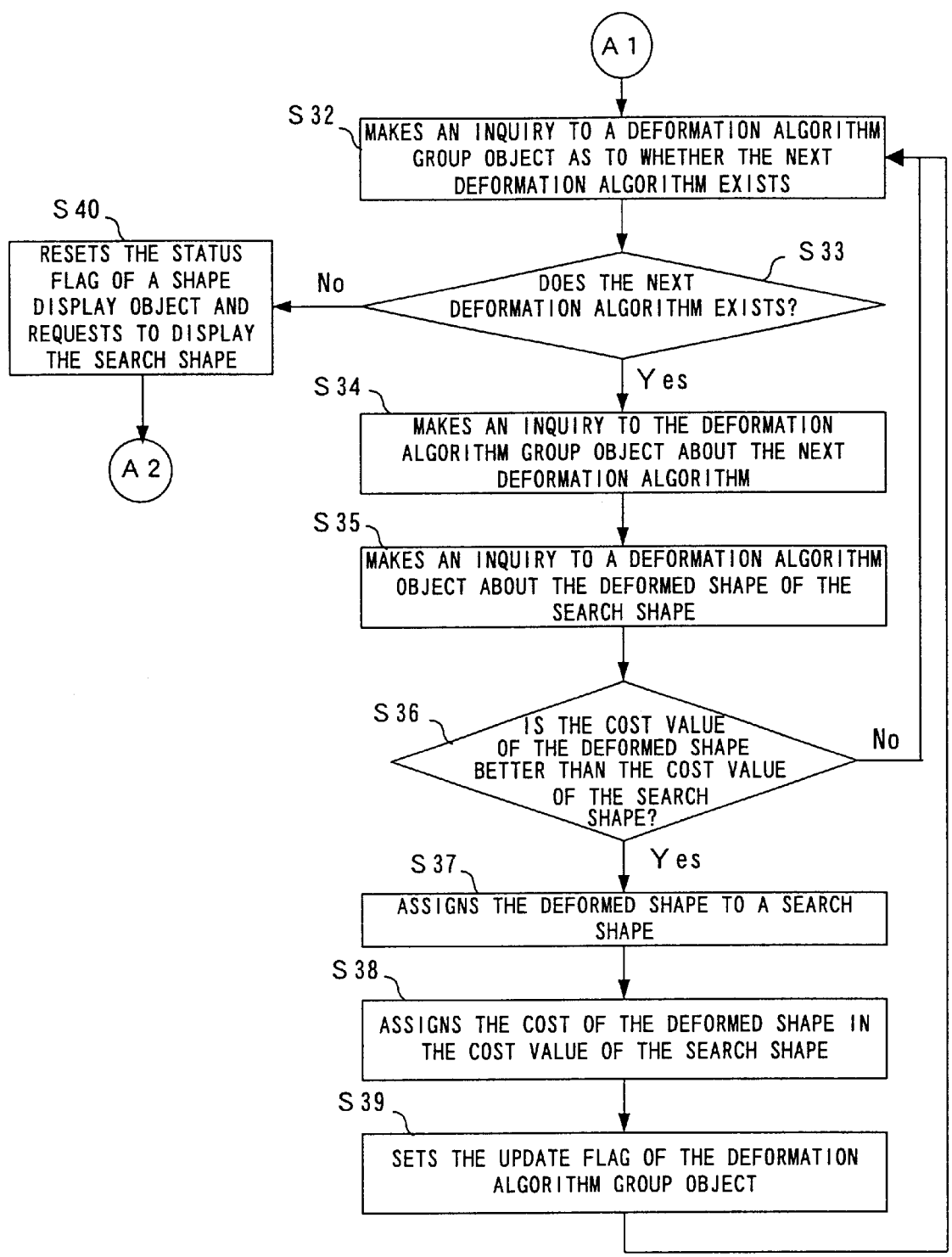
FIG. 22 is a flowchart showing the process of a search method (No.2).

FIGS. 21 and 22 are a flowchart showing the process of a search method possessed by the search engine object 41 shown in FIG. 3. The search method 44 first checks whether a shape object 42 indicating a search shape exists (step S21 shown in FIG. 21). If such a shape object 42 does not exist, the search method 44 terminates the process. If the shape object 42 exists, the search method 44 resets (turns off) the termination flag of a termination flag object 62 possessed by the stop button object 61 shown in FIG. 5 (step S22).

Then, the search method 44 checks whether the cost value of the search shape is obtained (step S23). If the cost value is not obtained, the search method 44 inquires of the cost function object 71 shown in FIG. 6 about the cost value of the search shape, and stores the obtained cost value in the cost value of a cost value object 43 (step S24).

Then, the search method 44 makes an inquiry to the stop button object 61 whether the termination flag of the termination flag object 62 is set (is turned on). If the termination flag is set, the search method 44 terminates the process (step S25).

Then, the search method 44 makes an inquiry to the deformation algorithm management object 91 shown in FIG. 8 as to whether the next deformation element exists (steps S26 and S27). If no next deformation element exists, the search method 44 sets the status flag of a status flag object 122 possessed by the shape display object 121 shown in FIG. 11, requests to display the search shape (step S28) and requests the deformation algorithm management object 91 to execute an initialization method 92 (step S29).

Then, the search method 44 makes an inquiry to the deformation algorithm management object 91 about the next deformation element (step S30), and requests the deformation algorithm group object 101 to execute the initialization method 92 based on the obtained deformation element (step S31).

Then, the search method 44 makes an inquiry to the deformation algorithm group object 101 as to whether the next deformation algorithm exists (steps S32 and S33 shown in FIG. 22). If the next deformation algorithm exists, the search method 44 acquires the deformation algorithm object 111 shown in FIG. 10 which indicates the deformation algorithm (step S34), and makes an inquiry to the obtained deformation algorithm object 111 about the deformed shape of the search shape (step S35).

Then, the search method 44 makes an inquiry to a cost function object 71 about the cost value of the obtained deformed shape, and compares the obtained cost value with the cost value of the search shape possessed by a cost value object 43 (step S36). If the cost value of the deformed shape equals or exceeds the cost value of the search shape, the search method 44 repeats the processes in steps S32 and after. If the cost value of the deformed shape is below the cost value of the search shape, the search method 44 adopts the deformed shape as the search shape and updates both the shape object 42 and the deformed deformation element object 45 (step S37).

Then, the search method 44 assigns the cost value of the deformed shape in the cost value of the cost value object 43 (step S38), sets the update flag of an update flag object 102 possessed by the deformation algorithm group object 101 (step S38) and repeats the processes in steps S32 and after.

If in step S33, no next deformation algorithm exists, the search method 44 resets the status flag of a status flag object 122 possessed by a shape display object 121, requests to display the search shape (step S40) and repeats the processes in steps S25 and after. Thus, the next deformation element is processed.

Figure 23:
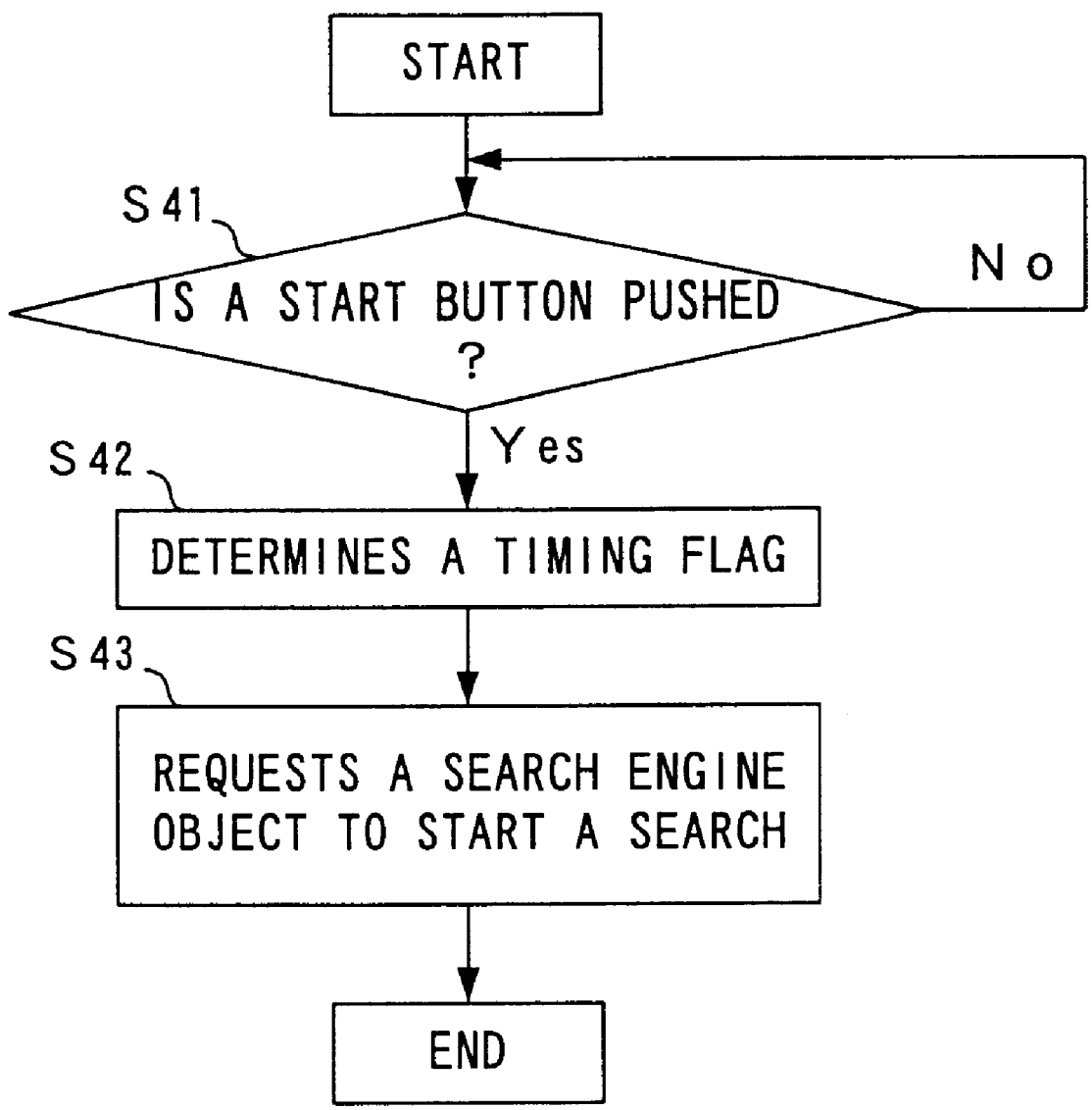
FIG. 23 is a flowchart showing the process of a start method.

FIG. 23 is a flowchart showing the process of a start method 53 possessed by the start button object 51 shown in FIG. 4. The start method 53 first regularly checks whether a start button is pushed (step S41). If the start button is pushed, the start method 53 determines the timing flag of a timing flag object 52 (step S42), requests a search engine object 41 to start a search (step S43) and terminates the process.

In step S42, two processes can be considered: one is a process to set a timing flag and the other is a process to reset the timing flag. Since, as described later, whether to display a search shape on a screen is determined based on the relationship between the timing flag and the status flag, a different display timing can be designated depending on whether to set or reset the timing flag.

FIG. 24 is a flowchart showing the process of a stop method 63 possessed by the stop button object 61 shown in FIG. 5. The stop method 63 first regularly checks whether a stop button is pushed (step S51). If the stop button is pushed, the stop method 63 sets the termination flag of a termination flag object 62 (step S52) and terminates the process.

Next, the configuration and operation of an object corresponding to an individual problem is described using a spring hanging problem and an N-body problem as specific optimization problems.

In the spring hanging problem, a spring is hung with both ends fixed and the shape of the spring is obtained when it finally stands still. In this problem, the shape object 42 shown in FIG. 3 has the spring shape (a line connecting N+2 points on an xy plane), the spring mass, the spring constant and the natural length of the spring as data. Two points at both ends of the N+2 connected points are fixed, and the deformation of the spring is caused by moving the remaining N points. In this case, the N points, excluding two points at both ends, out of N+2 points included in the shape object 42 become the deformation elements 45.

The cost function object 71 shown in FIG. 6 has the potential energy of a shape object 42 located under a constant gravity as a cost value. For example, it is assumed that the N+2 points of the shape object 42 are $p_0, p_1, p_2, \ldots, p_N, p_{N+1}$, that the coordinates of point $p_i$ is $(x, y)=(x_i, y_i)$ ($i=0, 1, \ldots, N, N+1$) and that $(x_0, y_0)=(0, 0)$ and $(x_{N+1}, y_{N+1})=(L, 0)$ are satisfied. If the spring mass, spring constant and the natural length of the spring are assumed to be M, k and $L_0$, respectively, the cost value of the shape object 42 can be obtained using the following expression.

$$\frac{M}{N}\sum_{i=1}^{N} y_i + \frac{kN}{2}\sum_{i=0}^{N}\left(|p_i - p_{i+1}| - \frac{L_0}{N}\right)^2.$$

This is provided, however, that the acceleration of gravity is assumed to be 1 for simplicity and $|p_i-p_{i+1}|$ indicates a distance between $p_i$ and $p_{i+1}$.

The starting shape creation object 81 shown in FIG. 7 includes the following GUI (graphic user interface) components displayed on a screen.

Figure 25:
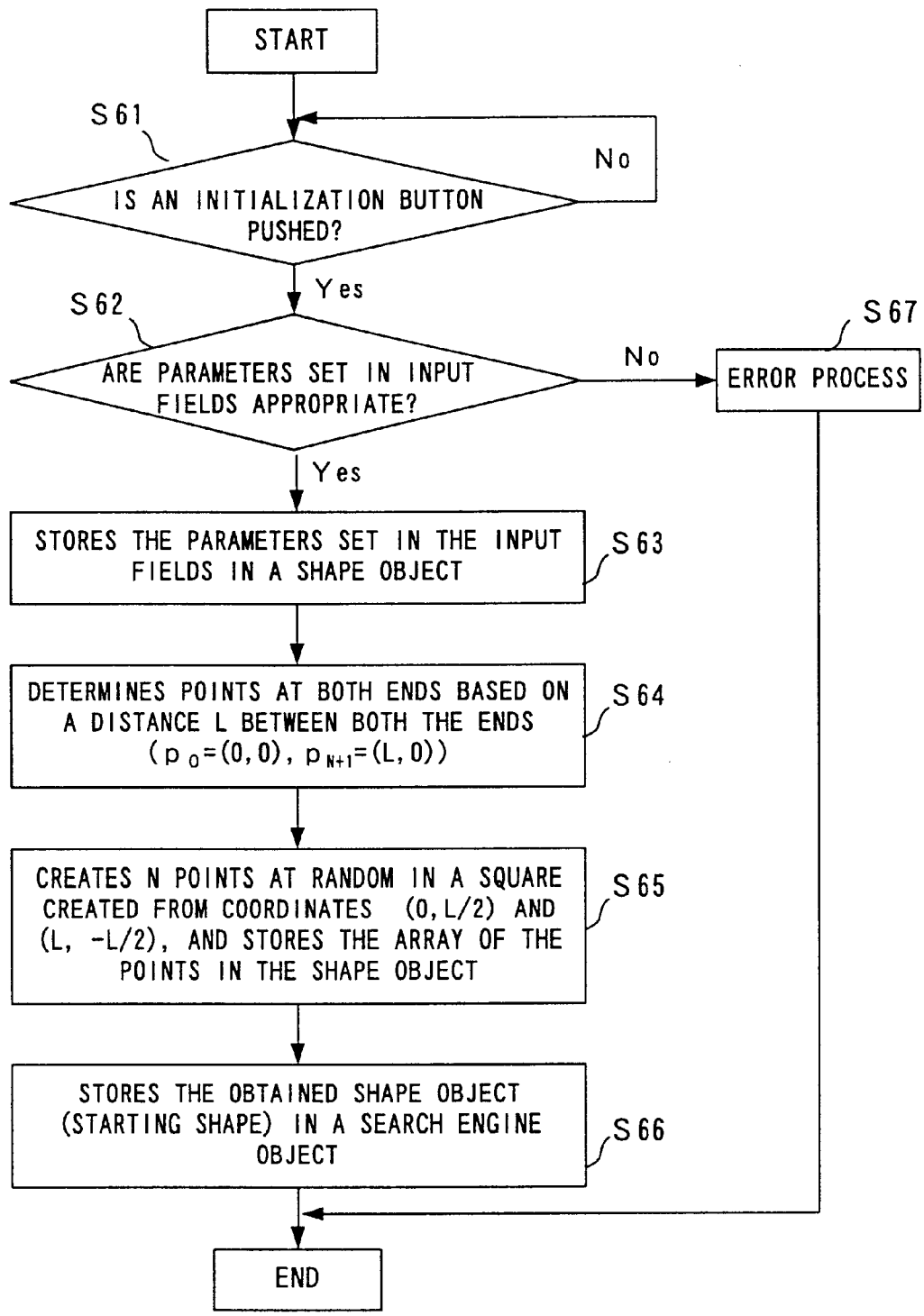
FIG. 25 is a flowchart showing the process of the first starting shape method.

(1) Input field for setting the spring mass M of a starting shape
(2) Input field for setting the spring constant k of a starting shape
(3) Input field for setting the spring natural length $L_0$ of a starting shape
(4) Input field for setting the distance L between the fixed ends of the spring of a starting shape
(5) Input field for setting the number N of points indicating the spring shape of a starting shape
(6) Initialization button for creating a starting shape FIG. 25 is a flowchart showing the process of a starting shape method 82 possessed by a starting shape creation object 81. The starting shape method 82 first regularly checks whether an initialization button is pushed (step S61). If the initialization button is pushed, the starting shape method 82 checks whether parameters set in the above-described input fields are appropriate (step S62).

If all the parameters are appropriate, the starting shape method 82 stores the parameters in a shape object 42 (step S63), sets the coordinates $(x_0, y_0)$ of $p_0$ to $(0, 0)$ and the coordinates $(x_{N+1}, y_{N+1})$ of $p_{N+1}$ to $(L, 0)$ based on the distance L between $p_0$ and $p_{N+1}$ (step S64).

Then, the starting shape method 82 creates N points at random in a square which is created using two coordinates $(0, L/2)$ and $(L, -L/2)$ as diagonal vertexes, and stores the array of those points in the shape object 42 as $p_1, p_2, \ldots, p_N$ (step S65). Then, the starting shape method 82 stores the obtained shape object 42 in a search engine object 41 as the starting shape (step S66), and terminates the process.

If in step S62, any of the parameters is not appropriate, the starting shape method 82 executes an error process to displays an error message, etc. (step S67), and terminate the process.

The deformation algorithm management object 91 shown in FIG. 8 has a pointer object for storing a pointer (integer) in addition to the above-described methods, and executes the following processes.

Figure 26:
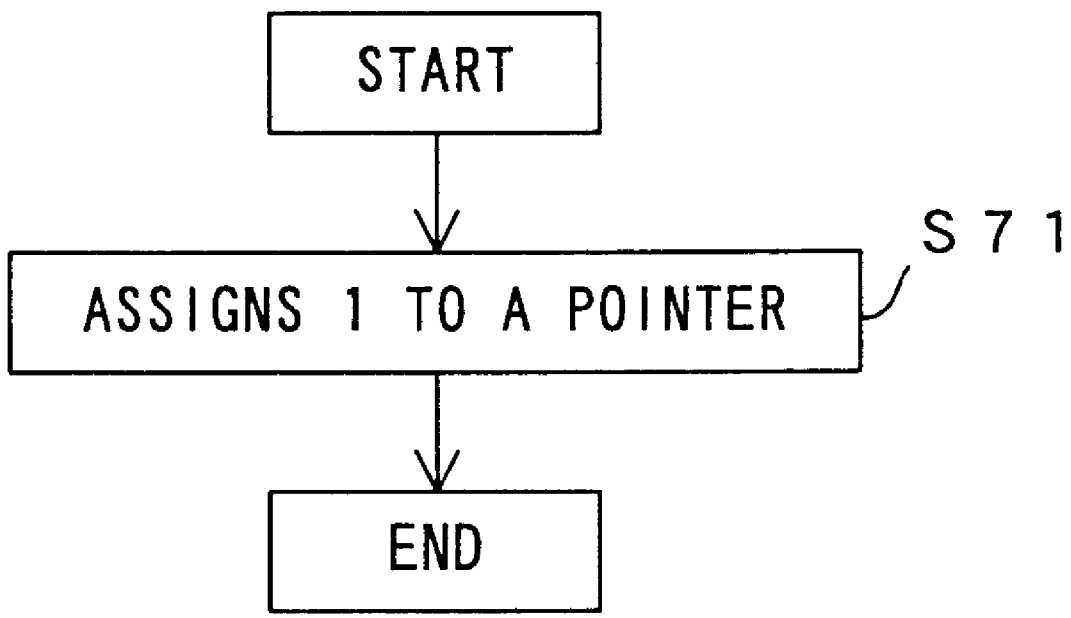
FIG. 26 is a flowchart showing the process of the first initialization method.

FIG. 26 is a flowchart showing the process of an initialization method 92 possessed by a deformation algorithm management object 91. The initialization method 92 assigns 1 to the pointer of the pointer object (step S71), and terminates the process.

Figure 27:
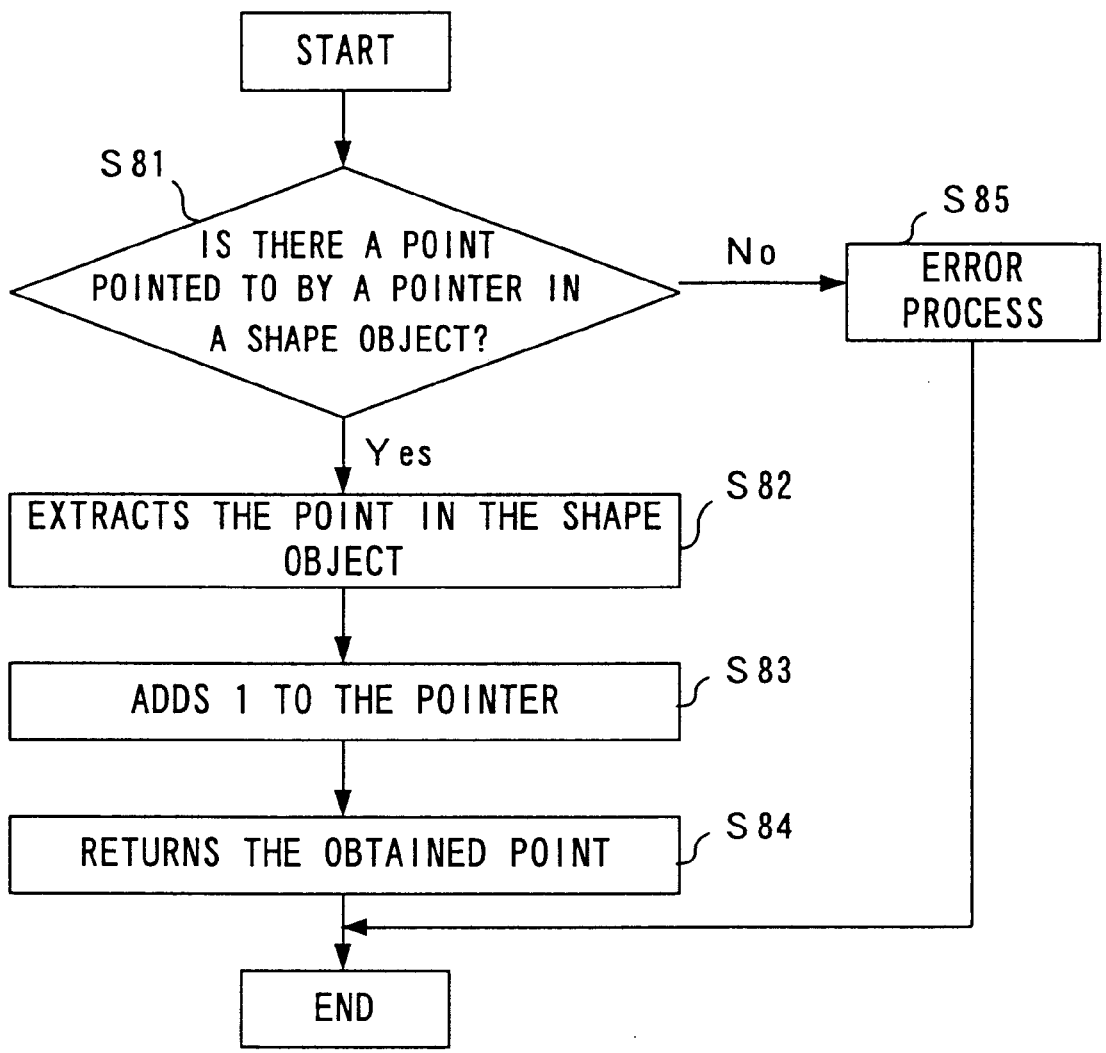
FIG. 27 is a flowchart showing the process of the first deformation element method.

FIG. 27 is a flowchart showing the process of a deformation element method 93 possessed by the deformation algorithm management object 91. The deformation element method 93 first checks whether there is a point corresponding to the pointer number in the shape object 42 (step S81). If there is the point, the deformation element method 93 extracts information about a corresponding deformation element object 45 (step S82). Then, the deformation element method 93 adds 1 to the pointer (step S83), returns the extracted information (step S84) and terminates the process.

If in step S81, there is no point corresponding to the pointer number, the deformation element method 93 executes an error process (step S85) and terminates the process.

Figure 28:
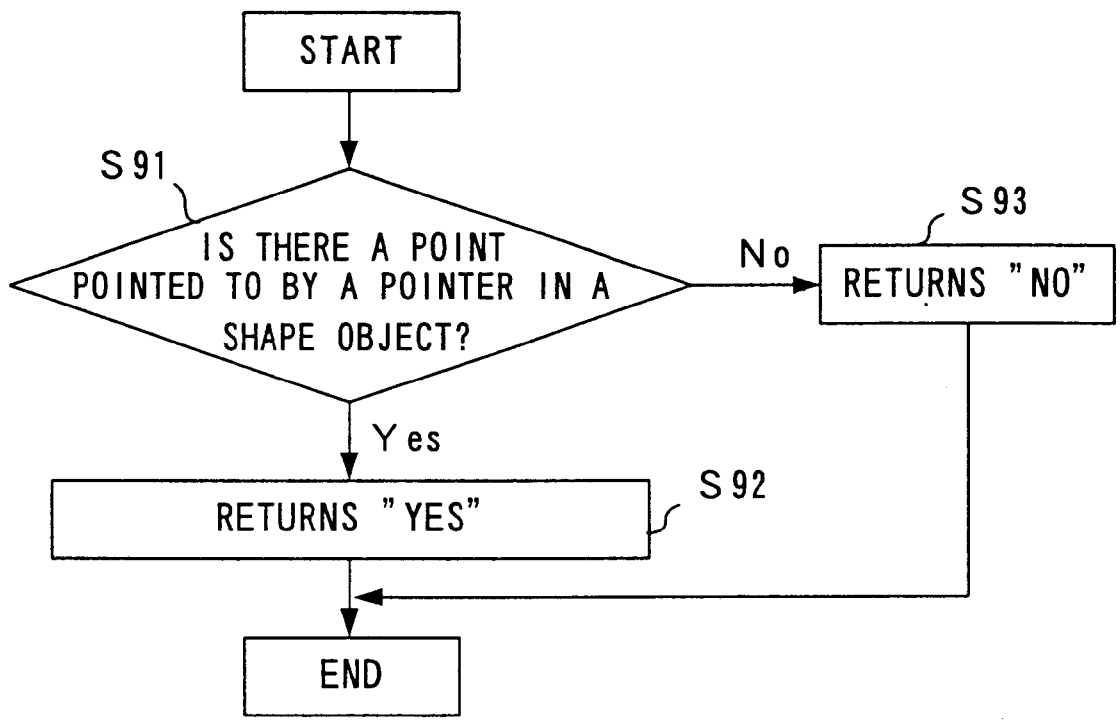
FIG. 28 is a flowchart showing the process of the first notice method.

FIG. 28 is a flowchart showing the process of a notice method 94 possessed by the deformation algorithm management object 91. The notice method 94 first checks whether there is a point corresponding to the pointer number in the shape object 42 (step S91). If there is the point, the notice method 94 returns "Yes" (step S92) and terminates the process. If there is no point, the notice method 94 returns "No" (step S93) and terminates the process.

The deformation algorithm group object 101 has a deformation element object 45, a counter object, a move amount object and a move direction object in addition to the update flag object 102. The counter object stores a counter (integer), and the move amount object stores the move amount (real number). The move direction object stores the move direction (two-dimensional vector).

Figure 29:
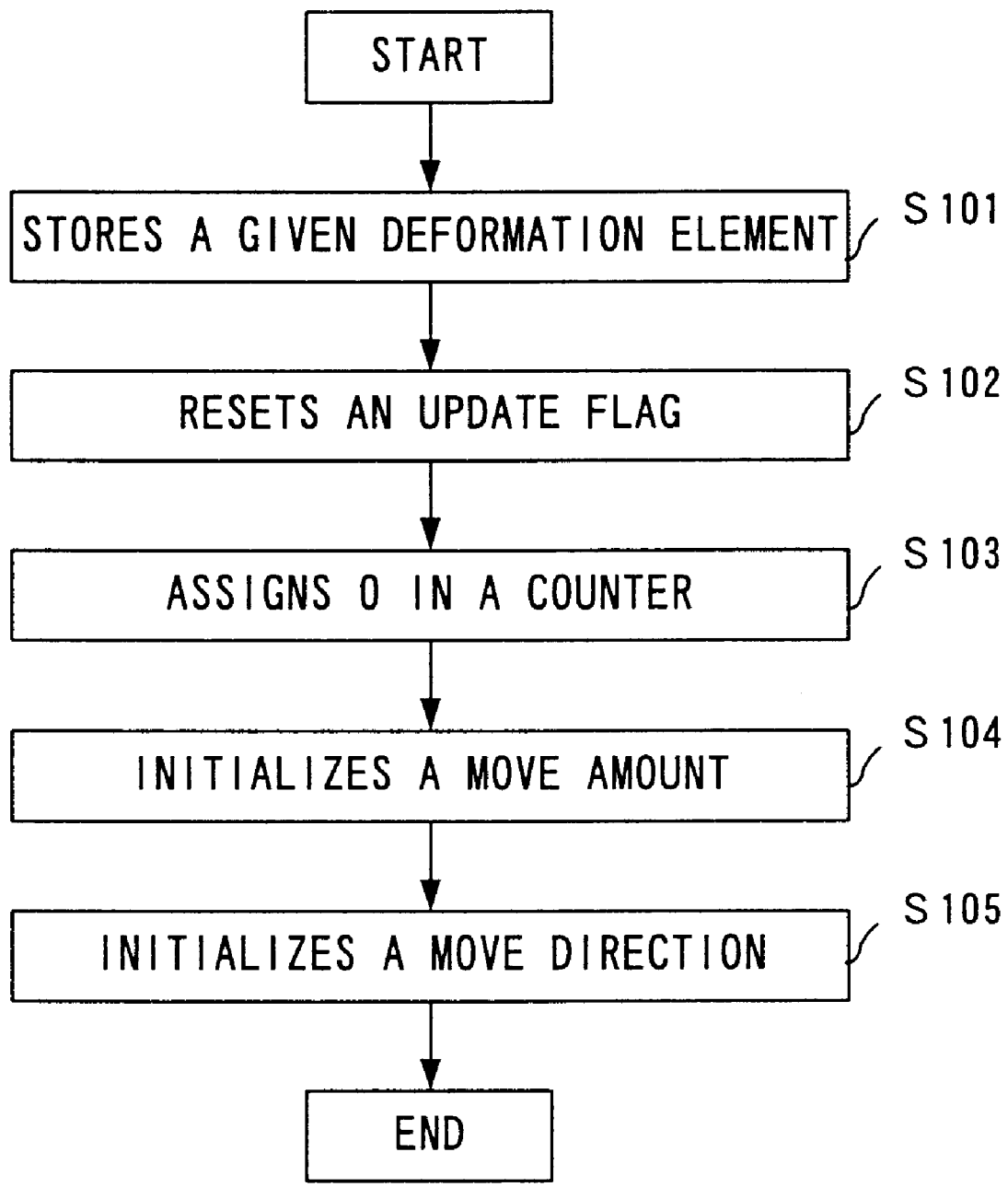
FIG. 29 is a flowchart showing the process of the second initialization method.

FIG. 29 is a flowchart showing the process of an initialization method 103 possessed by a deformation algorithm group object 101. The initialization method 103 first stores information about a given deformation element object 45 (step S101), resets the update flag of an update flag object 102 (step S102) and assigns 0 to the counter of the counter object (step S103). Then, the initialization method 103 initializes the move amount of the move amount object (step S104), initializes the move direction of the move direction object (step S105) and terminates the process.

In step S104, the move amount $\Delta p$ is initialized, for example, by the following expression.

$$\Delta p = \max|p_i - p_j|$$
$$0 \leq i \leq N+1$$
$$0 \leq j \leq N+1 \quad [2]$$

If the deformation element object 45 stored in step S101 is assumed to be a point $p_i$, the x component $d_x$ and y component $d_y$ of the two-dimensional vector indicating the move direction are initialized, for example, using the following expression in step S105.

$$d_x = k(\alpha_i(x_i - x_{i-1}) - \alpha_{i+1}(x_{i+1} - x_i))$$
$$d_y = M/N + k(\alpha_i(y_i - y_{i-1}) - \alpha_{i+1}(y_{i+1} - y_i))$$
$$\alpha_i = N - L_0/|p_i - p_{i-1}| \quad [3]$$

FIG. 30 is a flowchart showing the process of a deformation algorithm method 104 possessed by the deformation algorithm group object 101. The deformation algorithm method 104 first checks whether the two-dimensional vector $(d_x, d_y)$ indicating the move direction is $(0, 0)$ (step S111). If $(d_x, d_y)=(0, 0)$ is not satisfied, the deformation algorithm method 104 creates the move vector based on both the vector ($d_x$, $d_y$) and the move amount $\Delta p$, and creates a move vector object having the move vector (step S112). It is assumed here that the move vector with a length $\Delta p$ is created by multiplying the vector ($d_x$, $d_y$) by a scalar.

Then, the deformation algorithm method 104 creates the deformation algorithm object 111 shown in FIG. 10 based on both the deformation element object 45 and a move vector object (step S113). Then, the deformation algorithm method 104 halves the move amount $\Delta p$ (step S114), adds 1 to a counter (step S115), returns information about the created deformation algorithm object 111 (step S116) and terminates the process.

If in step S111, ($d_x$, $d_y$)=(0, 0) is satisfied, the deformation algorithm method 104 executes an error process (step S117) and terminates the process.

Figure 31:
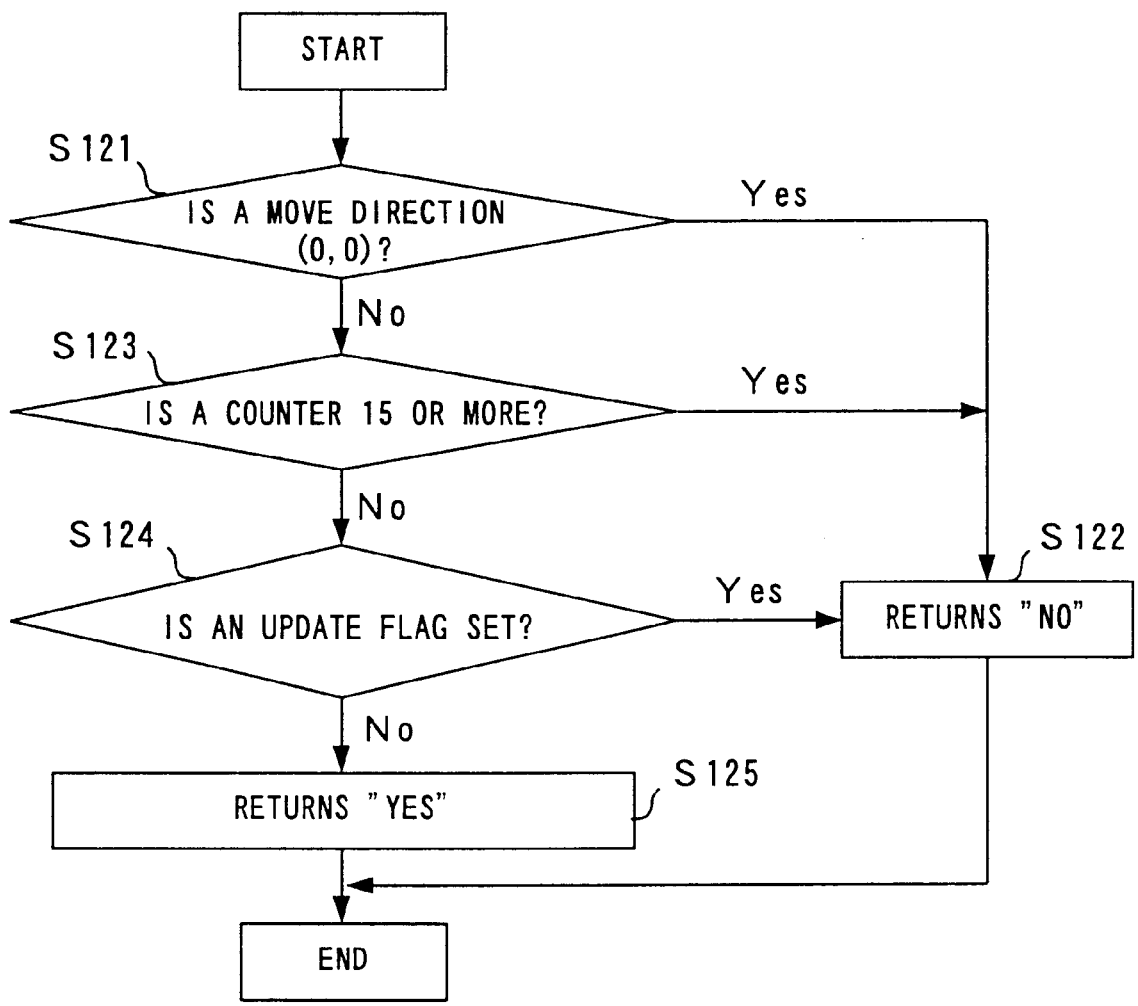
FIG. 31 is a flowchart showing the process of the second notice method.

FIG. 31 is a flowchart showing the process of a notice method 105 possessed by the deformation algorithm group object 101. The notice method 105 first checks whether ($d_x$, $d_y$)=(0, 0) is satisfied (step S121). If ($d_x$, $d_y$)=(0, 0) is satisfied, the notice method 105 returns "No" (step S122) and terminates the process.

If ($d_x$, $d_y$)=(0, 0) is not satisfied, the notice method 105 checks the counter (step S123). If the counter is 15 or more, the notice method 105 returns "No" (step S122) and terminates the process. If the counter is less than 15, the notice method 105 checks an update flag (step S124). If the update flag is set, the notice method 105 returns "No" (step S122) and terminates the process. If the flag is not set, the notice method 105 returns "Yes" (step S125) and terminates the process.

Figure 32:
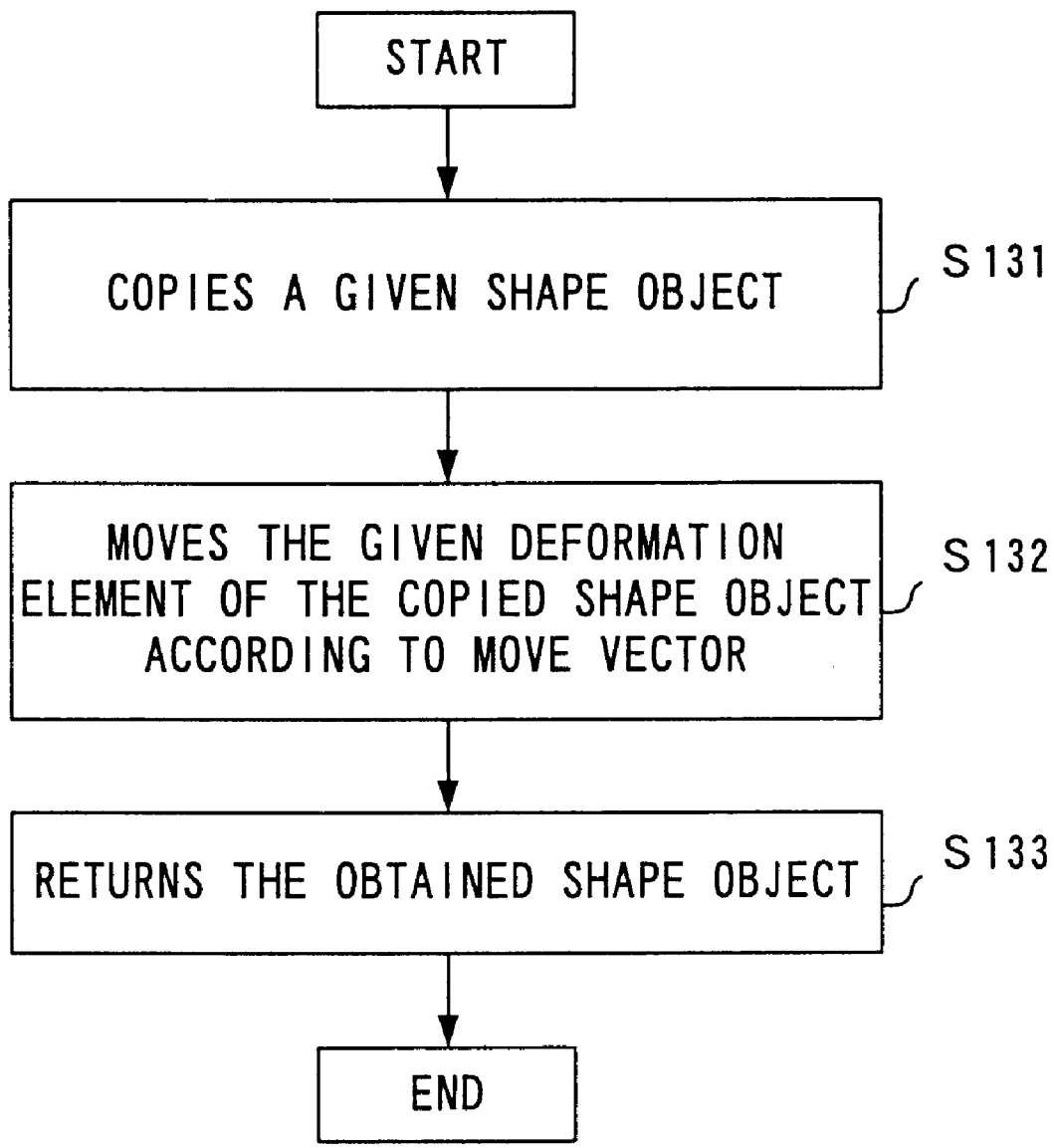
FIG. 32 is a flowchart showing the process of the first deformation method.

The deformation algorithm object 111 created in step S113 shown in FIG. 30 has both the deformation element object 45 and move vector object, and executes a process as shown in FIG. 32.

FIG. 32 is a flowchart showing the process of a deformation method 112 possessed by the deformation algorithm object 111. The deformation method 112 first generates a copy of a given shape object 42 (step S131), and moves the given deformation element object 45 included in the copy according to the move vector (step S132). Then, the deformation method 112 returns the obtained shape object (step S133) and terminates the process.

Figure 33:
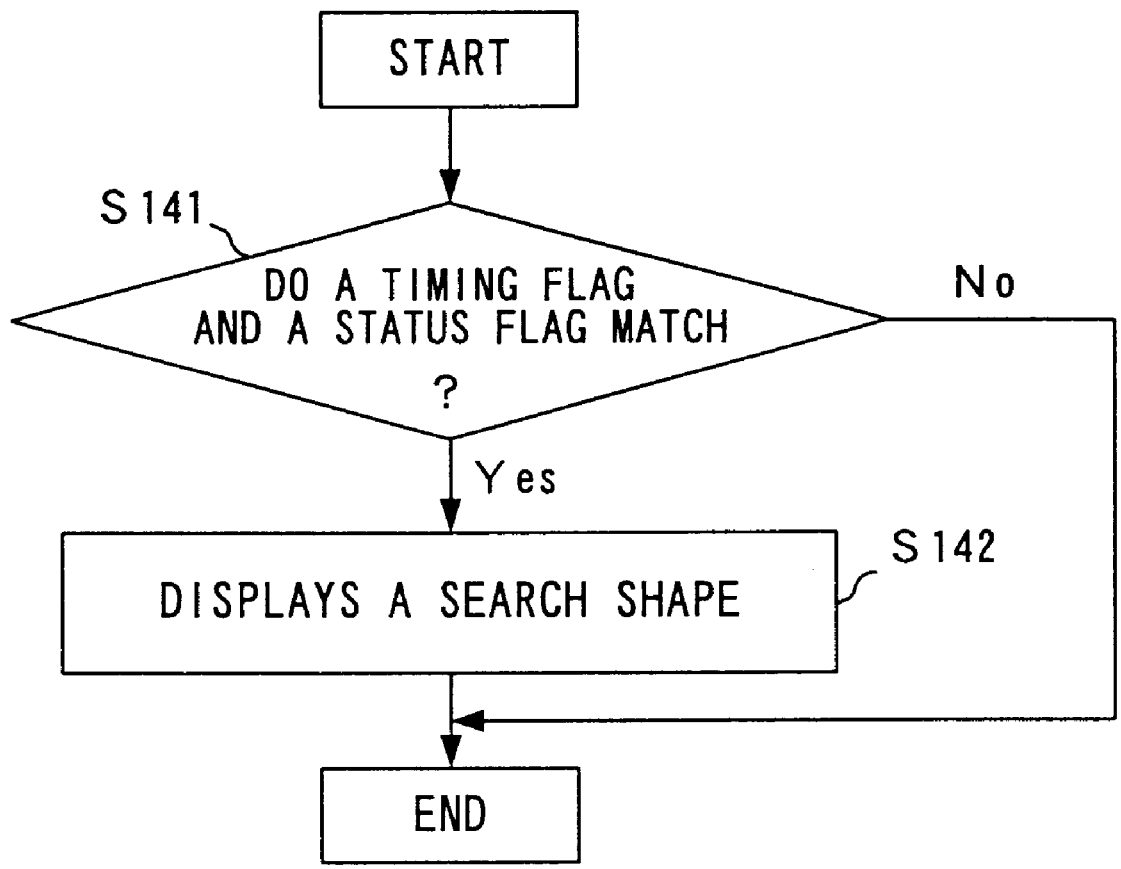
FIG. 33 is a flowchart showing the process of a display method.

FIG. 33 is a flowchart showing the process of a display method 123 possessed by the shape display object 121 shown in FIG. 11. The display method 123 first checks whether the timing flag of a timing flag object 52 and the status flag of a status flag object 122 match (step S141). If they match, the display method 123 displays a search shape indicated by the shape object 42 on a screen (step S142) and terminates the process. If they do not match, the display method 123 terminates the process without displaying the search shape.

Both the timing flag and status flag correspond to the reset state when the flag is set to logic "0", and correspond to the set state when the flag is set to logic "1". The status flag indicates the state where a search is completed for one deformation element when the flag is set to logic "0", and indicates the state where a round search is completed for all the deformation elements of a shape when the flag is set to logic "1".

Therefore, if when a start button is pushed, the timing flag is set to logic "0", a search shape is displayed on a screen each time a search is completed for one deformation element. If when the start button is pushed, the timing flag is set to logic "1", a search shape is displayed on a screen each time a round search is completed for all the deformation elements of a shape.

Figure 34:
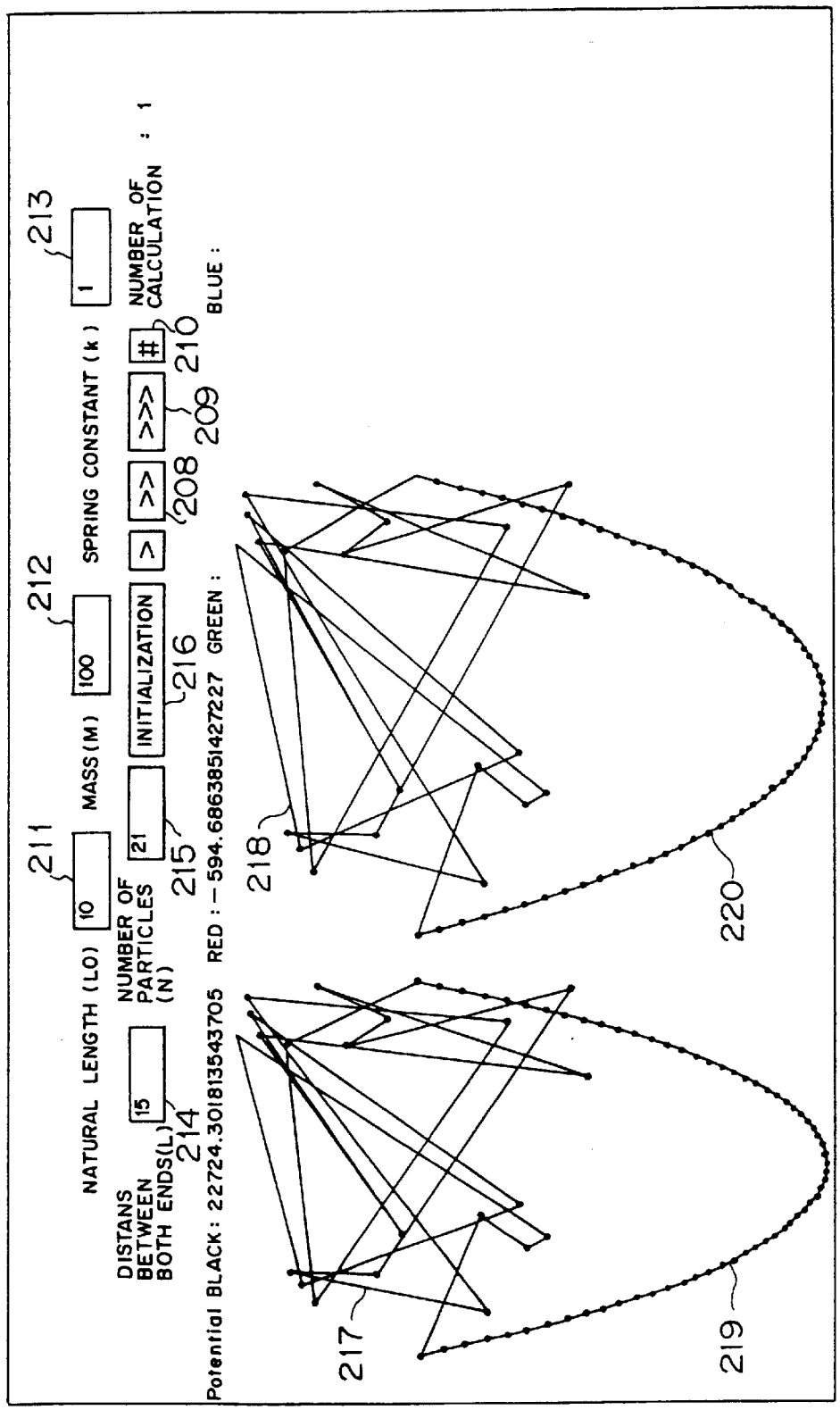
FIG. 34 shows the first display screen.
Figure 35:
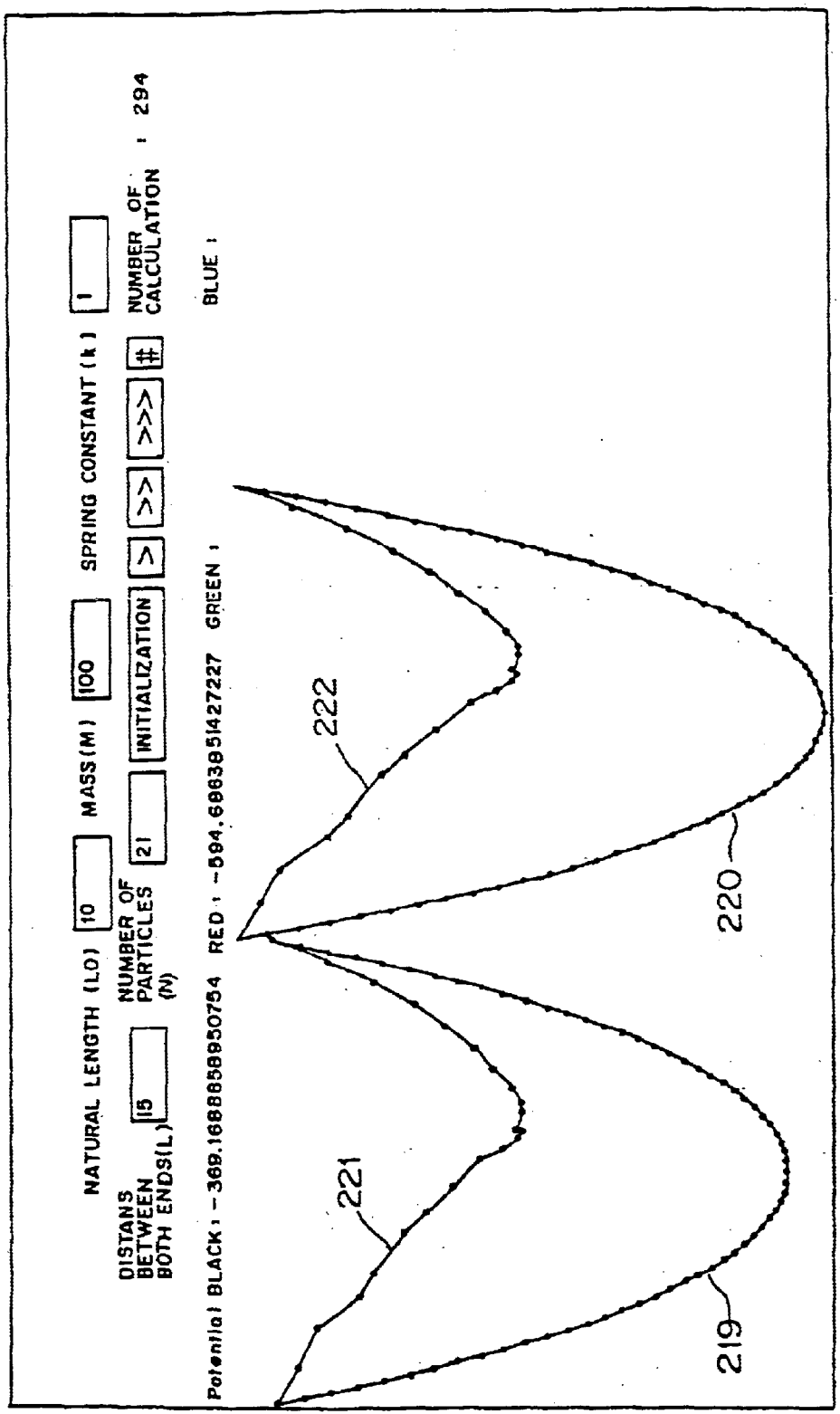
FIG. 35 shows the second display screen.
Figure 36:
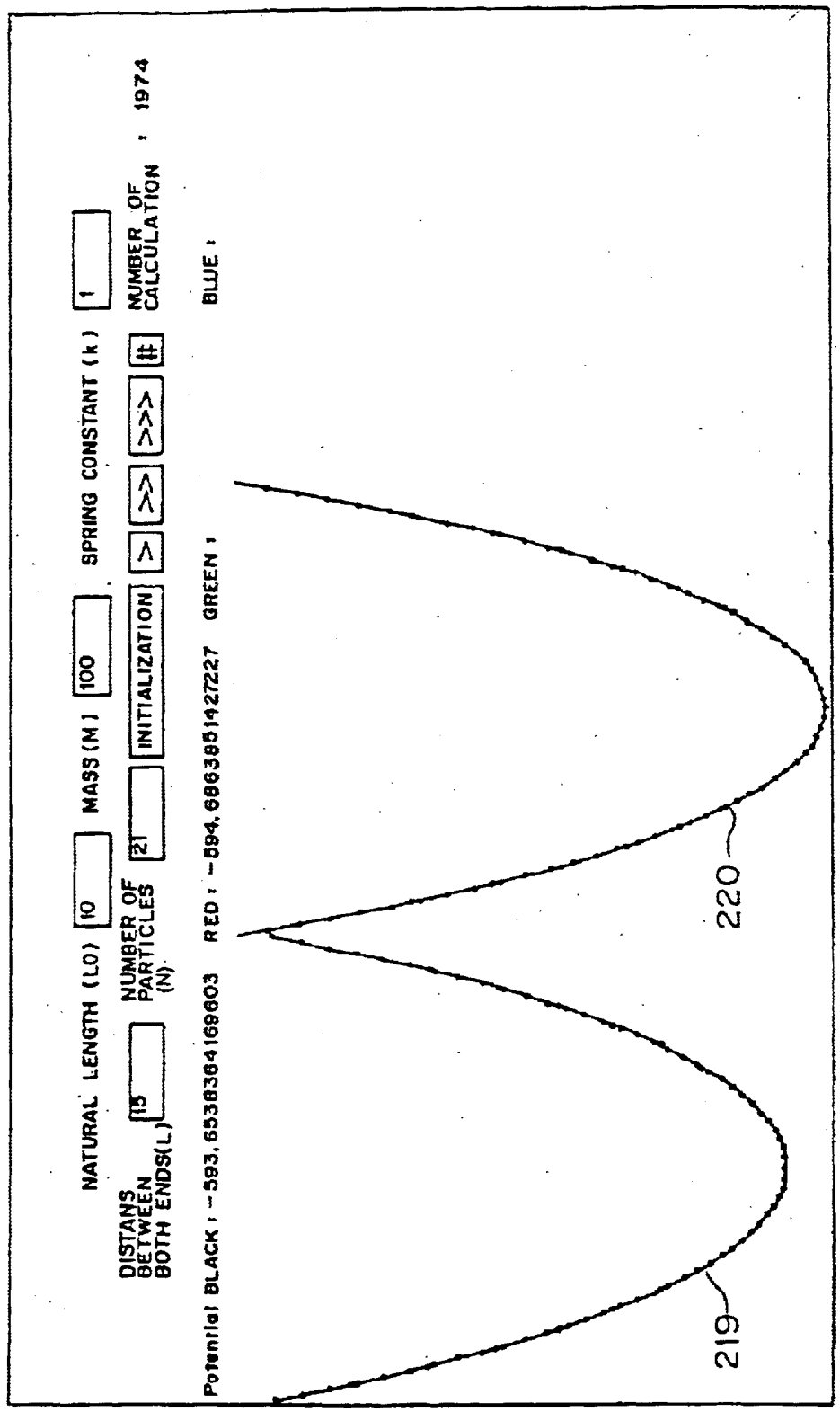
FIG. 36 shows the third display screen.
Figure 37:
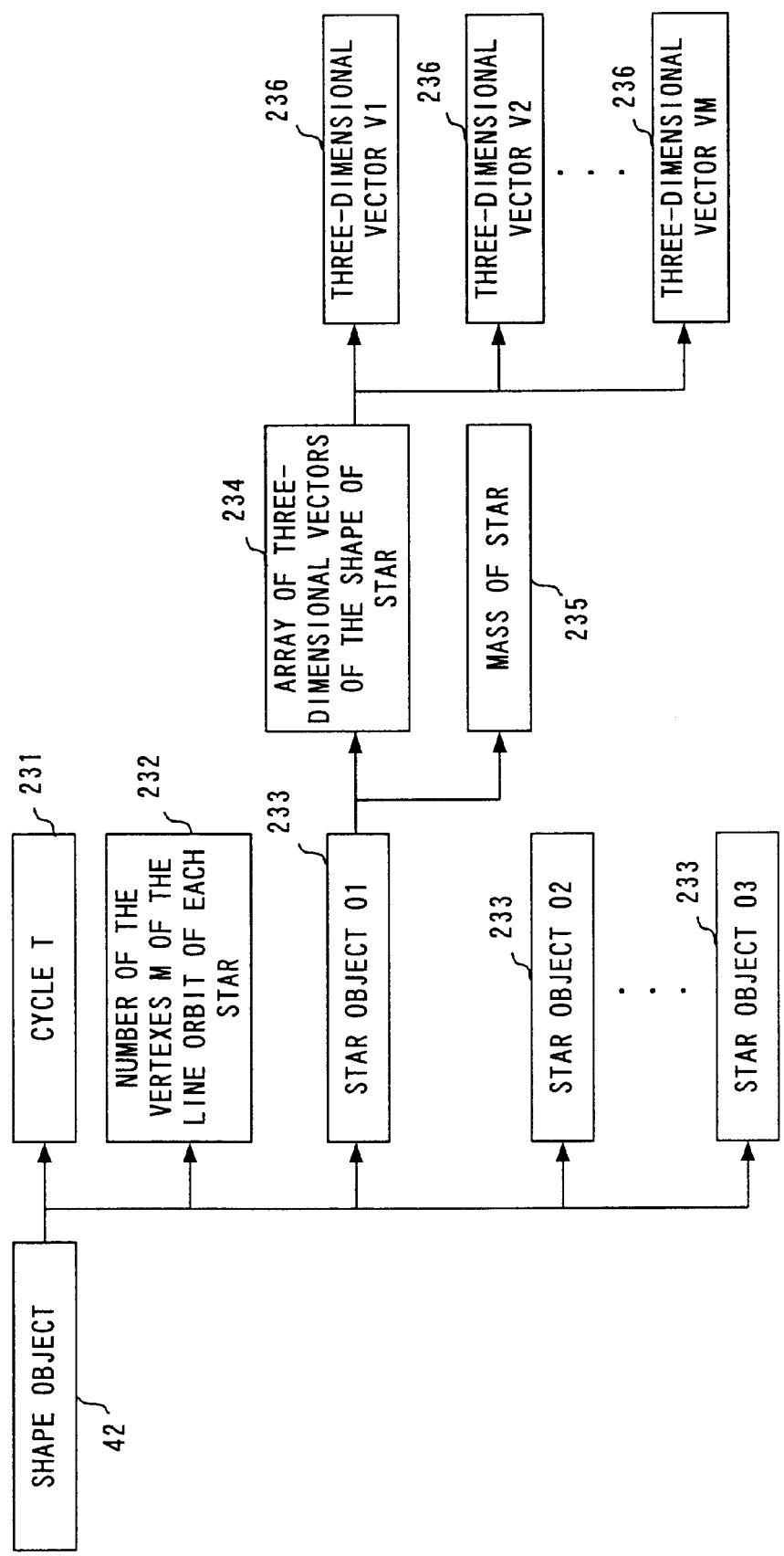
FIG. 37 shows the shape object of an N-body problem.

FIGS. 34 through 36 show examples of the display screens in the simulation of a spring hanging problem. On the display screen shown in FIG. 34, buttons 208 and 209 correspond to start buttons, and a button 210 corresponds to a stop button. For example, if the start button 208 is pushed, the timing flag is set to logic "0", and if the start button 209 is pushed, the timing flag is set to logic "1".

Fields 211, 212, 213, 214 and 215 correspond to the input field of the natural length $L_0$, mass M, spring constant k, distance between both ends L and the number N of movable points (particles), respectively, of a spring.

For example, if a user inputs $L_0$=10, M=100, k=1, L=15 and N=21, and pushes an initialization button 216, starting shapes 217 and 218 are displayed. The shapes 217 and 218 are the results obtained by displaying the same starting shape using two different methods. The shape 217 is displayed using the same scale for the horizontal and vertical axes, and the shape 218 is displayed using different scales for the horizontal and vertical axes. Parabolas 219 and 220 correspond to the final shapes of the spring, which are displayed in advance when a search is started.

If a search is performed using the shape shown in FIG. 34 as a starting shape, the shape of a spring changes into V-letter shapes 221 and 222, as shown in FIG. 35. When the search far advances, the shape of the spring converges into shapes almost overlapping the parabolas 219 and 220, as shown in FIG. 36.

In this way, in a spring hanging problem, a stable state can be searched for while changing a shape of a spring by representing the shape with an aggregate of a plurality of points and by moving each of the points. A user can automatically obtain the stationary state of the spring simply by inputting predetermined parameters.

Next, in an N-body problem, orbits of the periodic movement of N stars (heavenly bodies) are searched for. In this problem, the shape object 42 shown in FIG. 3 has data 231 on cycle T, data 232 on the number of vertexes M in the case where the orbit of each star is represented using a closed line graph, and an aggregate of N star objects 233 (O1 through ON).

Each star object 233 has both the shape object 234 of a star orbit (an array of three-dimensional vectors with the number of elements M) and the data 235 on the mass of a star. The shape object 234 has the position vectors 236 (V1 through VM) indicating the positions of M vertexes in the three-dimensional space.

The shape object 42 includes information about N stars, and the orbit of each star is displayed using a line with M vertexes. Specifically, the shape object 42 includes NM pieces of information about the vertexes of the line orbits, and each vertex is a deformation element object 45. In this case, the deformation element object 45 includes information of a star pointer for pointing to one of N stars, a vertex pointer for pointing to one of M vertexes and the position vector indicating the position of the vertex.

The cost function object 71 shown in FIG. 6 has an action in the dynamical system (the time integration of Lagrangian), which is caused by that N stars represented by the shape object 42 pull each other according to Newton's universal gravitation, as the cost value.

For example, it is assumed that the position vector Vi of the i-th vertex of the a-th star object Oa belonging to the shape object 42 is $p_{a,i}$ ($1 \leq a \leq N$, $1 \leq i \leq M$) and the mass of the star object Oa belonging to the shape object 42 is $M_a$. Three-dimensional arrays $p_{a,b,i}$ and $v_{a,b,i}$ ($1 \leq a$, $b \leq N$, $1 \leq i \leq M$) are defined by the following equations.

$$p_{a,b,i} = p_{a,i} - p_{b,i}$$

$$v_{a,b,i} = p_{a,b,(i+1) \bmod M} - p_{a,b,i} \quad [4]$$

In this case, the cost value of the shape object 42 is calculated by the following expression.

$$\frac{M}{2T}\sum_{a=1}^{N} M_a \sum_{i=1}^{M} |p_{a,i} - p_{a,(i-1)modM}|^2 - \frac{T}{M}\sum_{1\leq a<b\leq N} M_a M_b \qquad [5]$$

$$\sum_{i=1}^{M} \log\frac{|p_{a,b,(i+1)modM}||v_{a,b,i}| + (p_{a,b,(i+1)modM}, v_{a,b,i})}{|p_{a,b,i}||v_{a,b,i}| + (p_{a,b,i}, v_{a,b,i})}$$

$$\frac{}{|v_{a,b,i}|}$$

where the acceleration of gravity is 1 for simplicity, and (i+1) mod M indicates a remainder calculation according to M.

Figure 38:
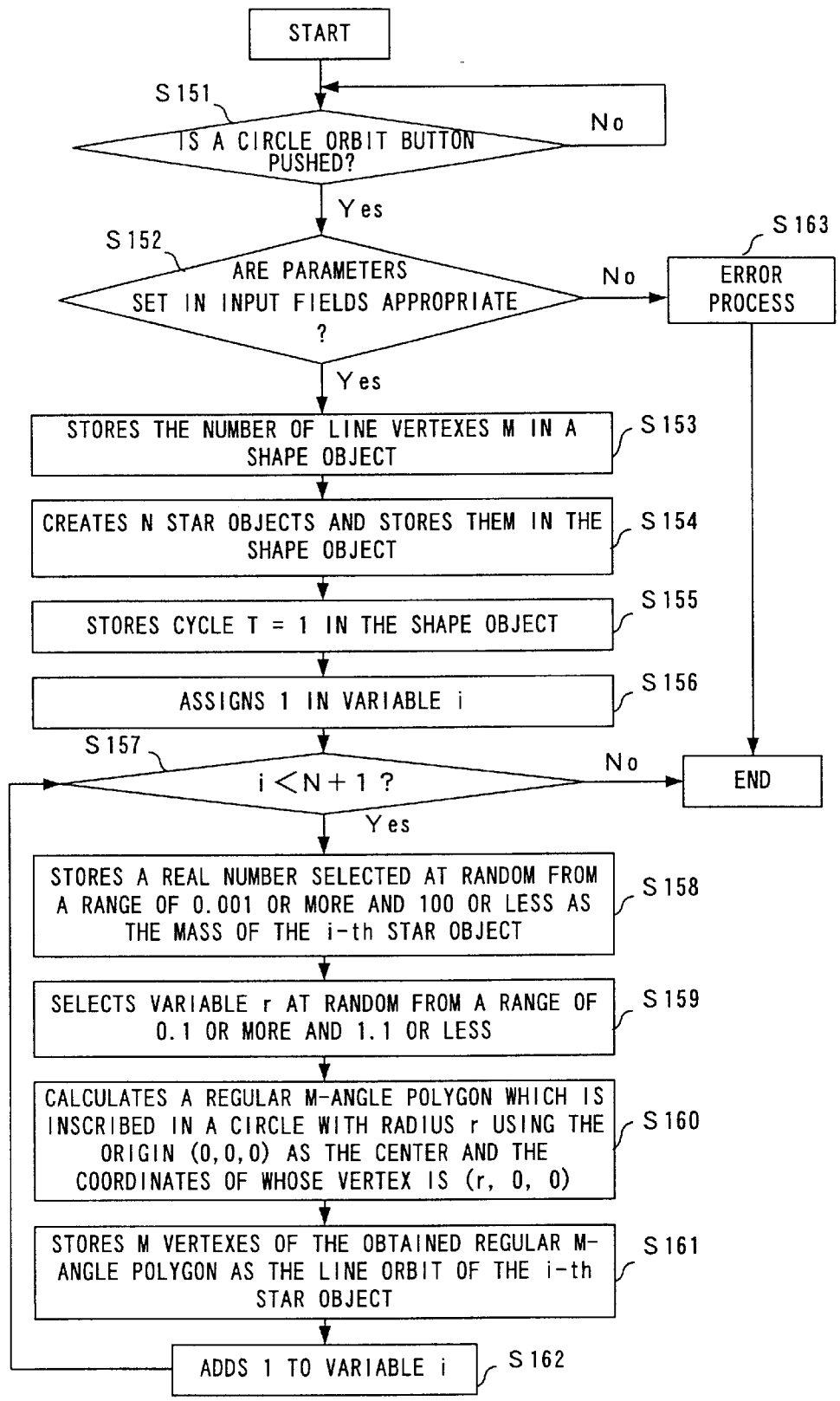
FIG. 38 is a flowchart showing the process of the second starting shape method.

The starting shape creation object 81 shown in FIG. 7 includes the following GUI components displayed on a screen.
(1) Input Field for Setting the Number of Stars N in a Starting Shape
(2) Input Field for Setting the Number of Vertexes M in the Case Where the Orbit of a Star in a Starting Shape is Represented Using a Line Graph
(3) Circle Orbit Button for Creating a Starting Shape FIG. 38 is a flowchart showing a starting shape method 82 possessed by the starting shape creation object 81. The starting shape method 82 first regularly checks whether a circle orbit button is pushed (step S151). If the circle orbit button is pushed, the starting shape method 82 checks whether parameters set in the above-described input fields are appropriate (step S152).

If all the parameters are appropriate, the starting shape method 82 stores the number of vertexes M in the shape object 42 (step S153), stores the number of stars N in the shape object 42 (step S154), and stores the cycle T=1 in the shape object 42 (step S155).

Then, the starting shape method 82 assigns 1 to variable i (step S156), and compares i with N+1 (step S157). If i<N+1 is satisfied, the starting shape method 82 selects at random a real number which is 0.001 or more and simultaneously is 100 or less, and stores the real number in the i-th star object Oi as the mass (step S158).

Then, the starting shape method 82 selects at random a real number which is 0.1 or more and simultaneously is 1.1 or less, and assigns the real number in variable r (step S159). Then, the starting shape 82 calculates a regular M-angle polygon which is inscribed in a circle with radius r using the origin (x, y, z)=(0, 0, 0) of an xyz space as the center and the coordinates of whose vertex is (r, 0, 0) (step S160). Then, the starting shape method 82 stores the array of the position vectors of M vertexes of the regular M-angle polygon in the star object Oi as a line orbit (step S161).

Then, the starting shape method 82 adds 1 to variable i (step S162), repeats the processes in steps S157 and after, and if i reaches N+1, terminates the process. If in step S152 any of the parameters is inappropriate, the starting shape method 82 executes an error process (step S163) and terminates the process.

The deformation algorithm management object 91 shown in FIG. 8 has both a star pointer object storing a star pointer (integer) and a vertex pointer object storing a vertex pointer (integer), and executes the following processes.

Figure 39:
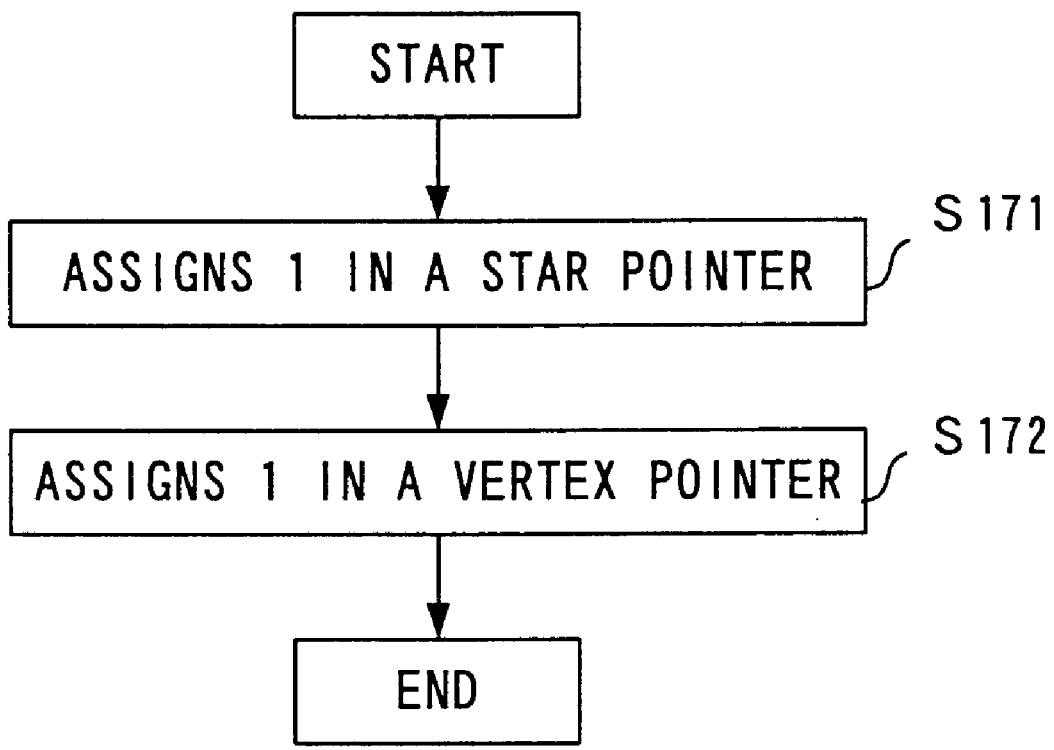
FIG. 39 is a flowchart showing the process of the third initialization method.

FIG. 39 is a flowchart showing an initialization method 92 possessed by the deformation algorithm management object 91. The initialization method 92 assigns 1 to the star pointer of the star pointer object (step S171), assigns 1 to the vertex pointer of the vertex pointer object (step S172) and terminates the process.

Figure 40:
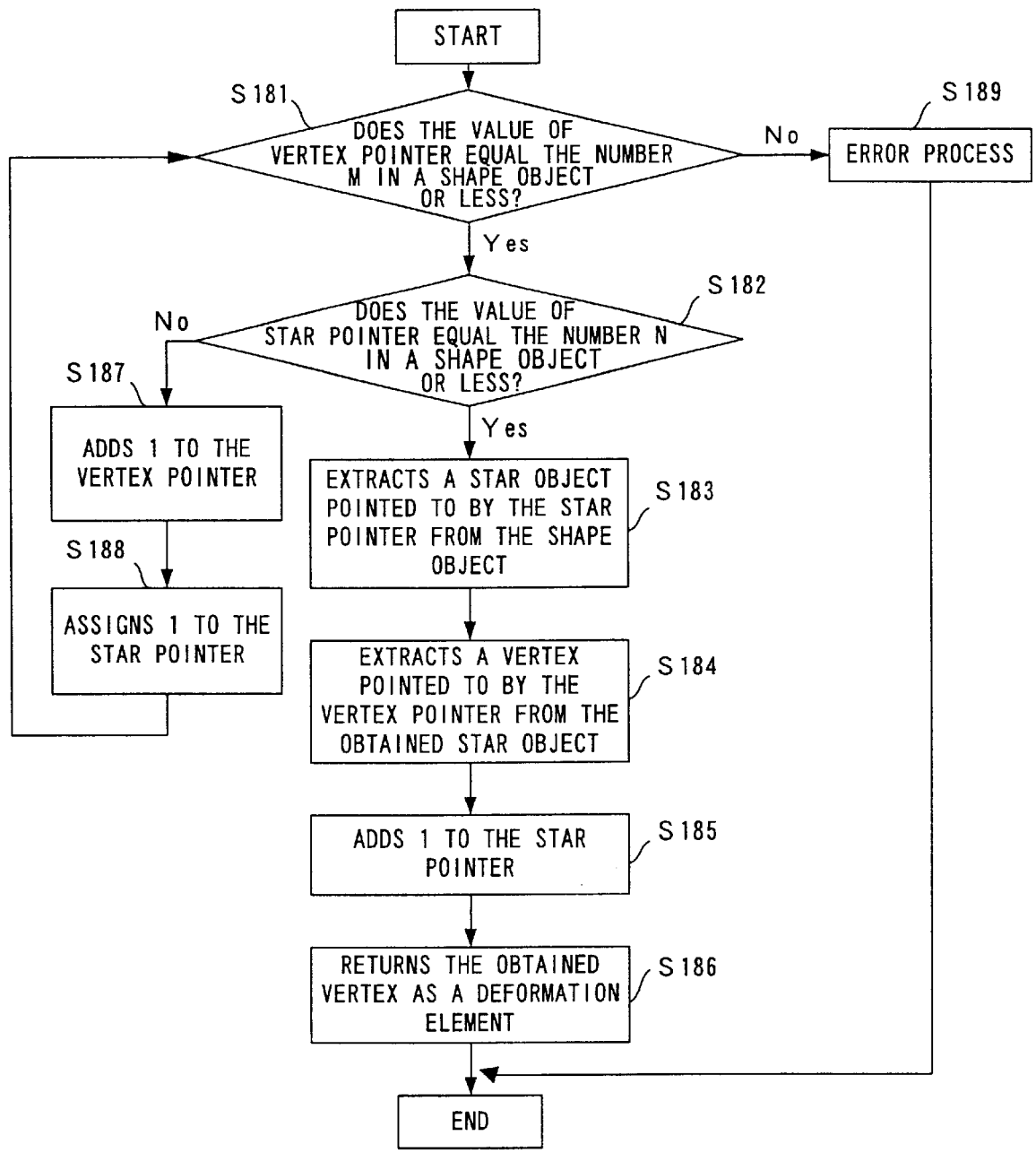
FIG. 40 is a flowchart showing the process of the second deformation element method.

FIG. 40 is a flowchart showing a deformation element method 93 possessed by the deformation algorithm management object 91. The deformation element method 93 first compares the value of the vertex pointer with M possessed by the shape object 42 (step S181). If the value of the vertex pointer is M or less, the deformation element method 93 compares the value of the star pointer with the number N of star objects 233 possessed by the shape object 42 (step S182).

If the value of the star pointer is N or less, the deformation element method 93 extracts information about a star object 233 corresponding to the star pointer from the shape object 42 (step S183), and extracts the position vector 236 of a vertex corresponding to the vertex pointer from the star object 233 (step S184). Then, the deformation element method 93 adds 1 to the star pointer (step S185), returns information about the extracted vertex as a deformation element (step S186) and terminates the process.

If in step S182, the value of the star pointer exceeds N, the deformation element method adds 1 to the vertex pointer (step S187), assigns 1 to the star pointer (step S188) and repeats the processes in steps S181 and after. If in step S181, the value of the vertex pointer exceeds M, the deformation element method 93 executes an error process (step S189) and terminates the process.

Figure 41:
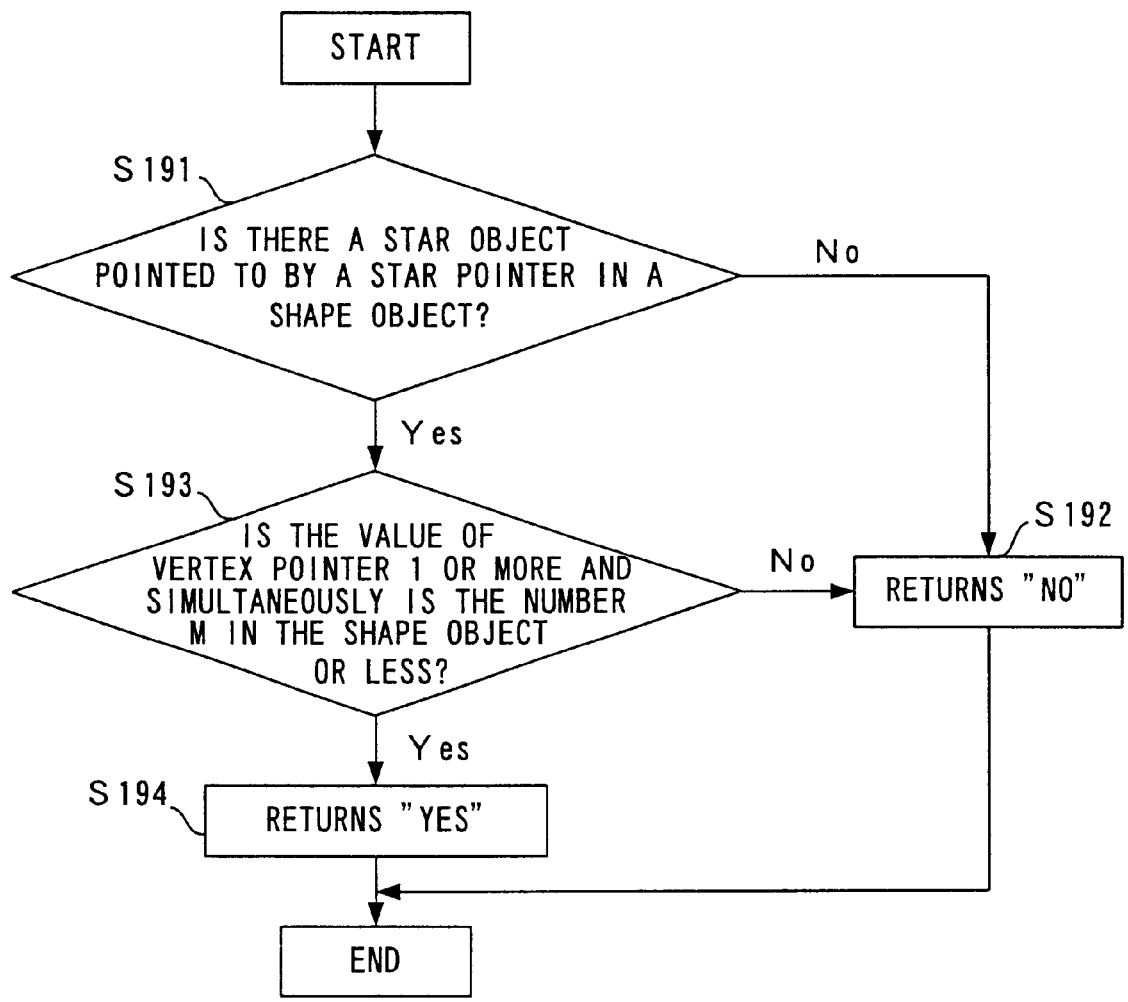
FIG. 41 is a flowchart showing the process of the third notice method.

FIG. 41 is a flowchart showing a notice method 94 possessed by the deformation algorithm management object 91. The notice method 94 first checks whether there is a star object 233 corresponding to the star pointer in the shape object 42 (step S191). If there is no corresponding star object 233, the notice method 94 returns "No" (step S192) and terminates the process.

If there is a star object 233 corresponding to the star pointer, the notice method 94 checks the value of the vertex pointer (step S193). If the value of the vertex pointer is 1 or more and simultaneously is M or less, the notice method 94 returns "Yes" (step S194) and terminates the process. If the value of the vertex pointer is less than 1 or is more than M, the notice method 94 returns "No" (step S192) and terminates the process.

The deformation algorithm group object 101 shown in FIG. 9 has a star pointer object, a vertex pointer object, a move amount counter object, a move amount object, a move direction table object and a move direction table counter object in addition to the update flag object 102.

The move amount counter object stores a move amount counter (integer), and the move amount object stores the move amount (real number). The move direction table object stores a move direction table (the array of three-dimensional vectors), and the move direction table counter object stores a move direction table counter (integer).

Figure 42:
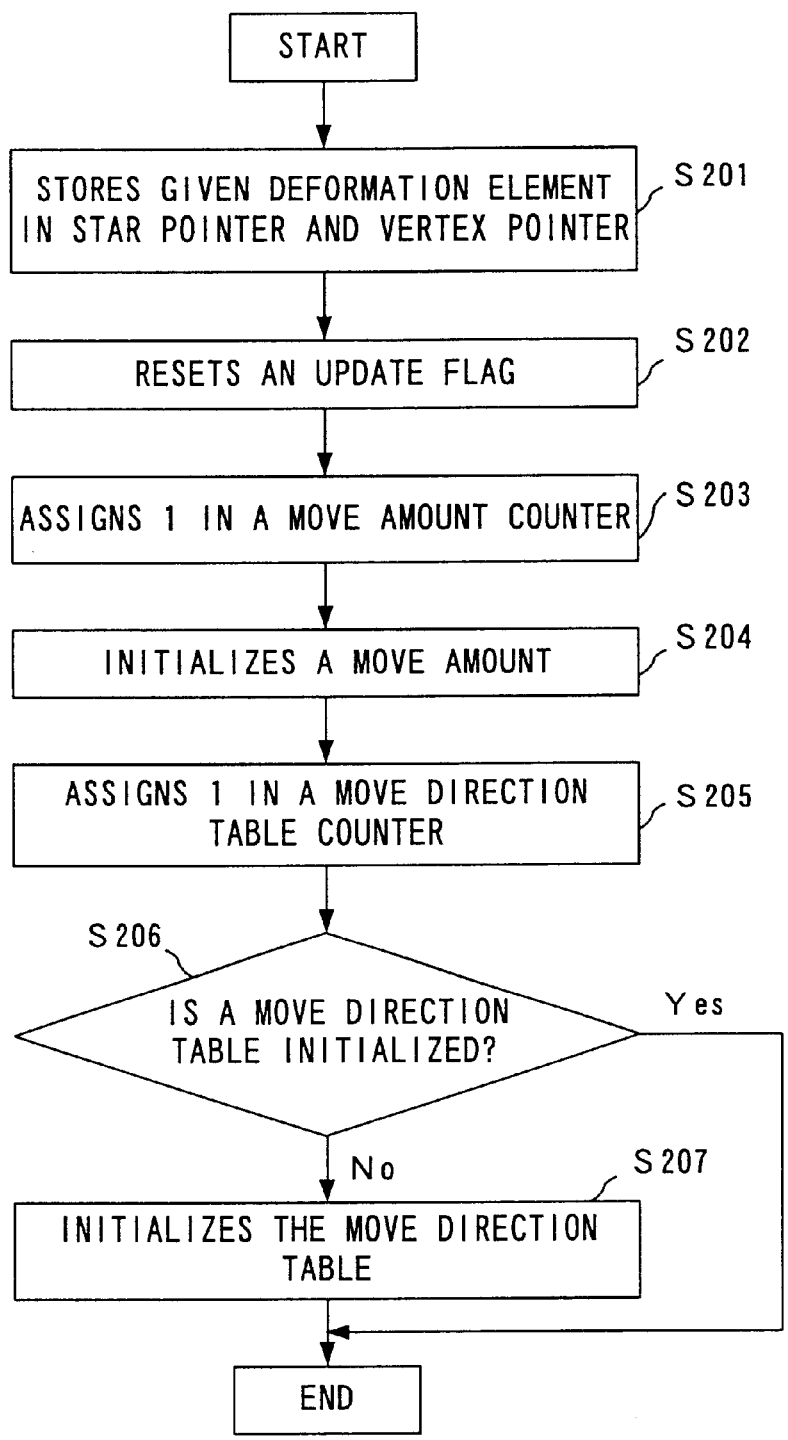
FIG. 42 is a flowchart showing the process of the fourth initialization method.

FIG. 42 is a flowchart of an initialization method 103 possessed by the deformation algorithm group object 101. The initialization method 103 first stores information about a given deformation element object 45 in the star pointer object and vertex pointer object (step S201), resets the update flag of an update flag object 102 (step S202) and assigns 1 to the move amount counter of the move amount counter object (step S203).

Then, the initialization method 103 initializes the move amount of the move amount object (step S204), assigns 1 to the move direction table counter of the move direction table counter object (step S205) and checks whether the move direction table of the move direction table object is initialized (step S206).

If the move direction table is initialized, the initialization method 103 terminates the process. If the move direction table is not initialized, the initialization method 103 initializes the move direction table (step S207) and terminates the process.

If it is assumed that the values of the star pointer and vertex pointer stored in step S201 are a and i, respectively, in step S204 the move amount Δp is initialized, for example, by the following equation.

$$\Delta p = (1/4)(|p_{a,i-1} - p_{a,i}| + |p_{a,i} - p_{a,i+1}|) \quad [6]$$

where $p_{a,i-1}$, $p_{a,i}$ and $p_{a,i+1}$ indicate the position vectors of the (i−1)-th, i-th and (i+1)-th vertexes, respectively, of a star object Oa corresponding to the star pointer.

In step S207, the move direction table is initialized, for example, as follows. First, three-dimensional vectors $e_1$, $e_2$ and $e_3$ are selected as follows.

$$e_1 = (1, 0, 0)$$
$$e_2 = (0, 1, 0)$$
$$e_3 = (0, 0, 1) \quad [7]$$

Then, the initialization method 103 creates a three-dimensional array with six elements, and assigns $e_1$, $-e_1$, $e_2$, $-e_2$, $e_3$ and $-e_3$ in the first, second, third, fourth, fifth and sixth elements, respectively, of the array. Then, the initialization method 103 designates this array of three-dimensional vectors as the move direction table.

Figure 43:
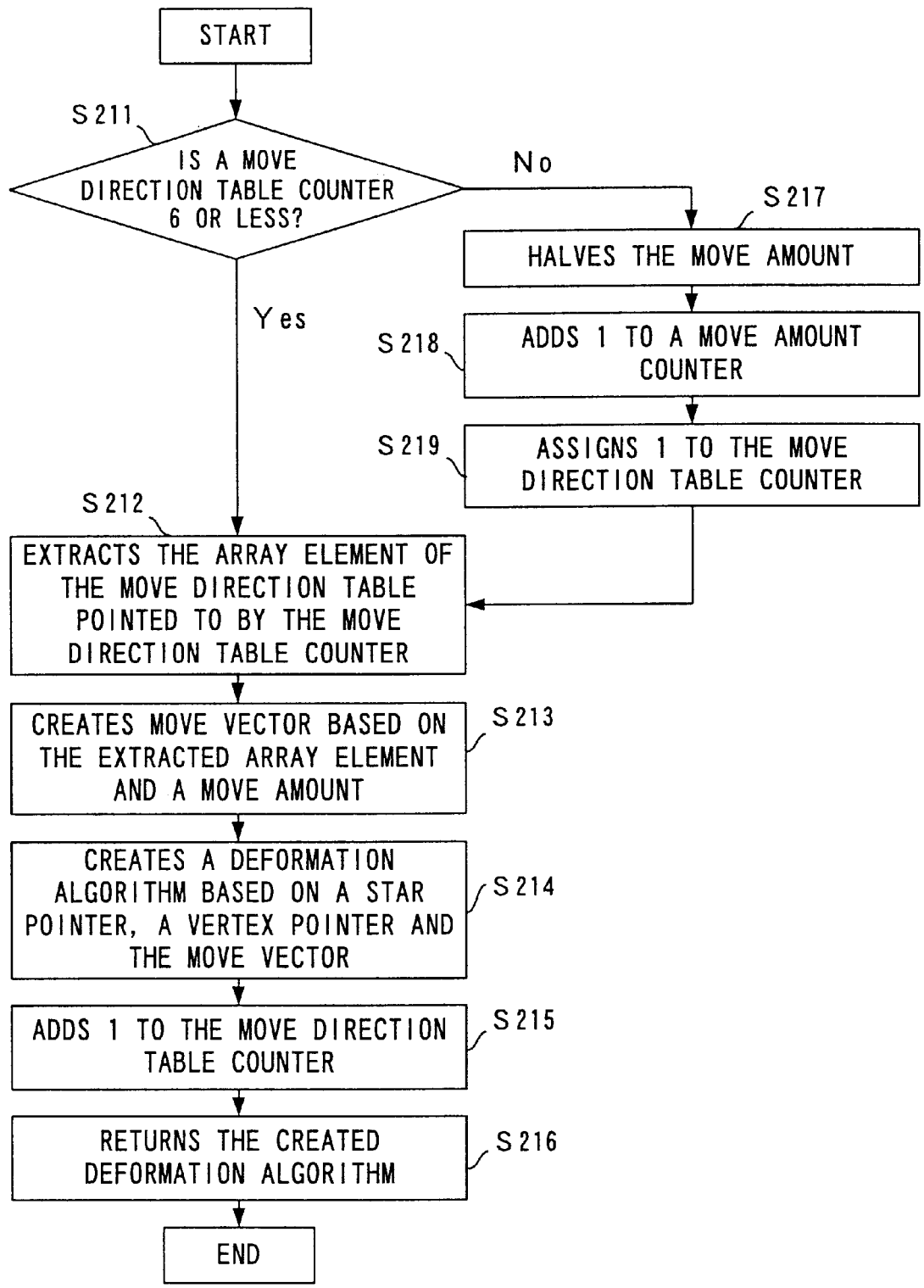
FIG. 43 is a flowchart showing the process of the second deformation algorithm method.

FIG. 43 is a flowchart showing a deformation algorithm method 104 possessed by the deformation algorithm group object 101. The deformation algorithm method 104 first checks the value of a move direction table counter (step S211).

If the value of the counter is six or less, the deformation algorithm method 104 extracts an array element corresponding to the counter from the move direction table (step S212), creates a move vector based on both the array element and the move amount Δp, and creates a move vector object having the move vector (step S213). It is assumed here that the move vector with length Δp is obtained by multiplying the extracted three-dimensional vector by a scalar.

Then, the deformation algorithm method 104 creates the deformation algorithm object 111 shown in FIG. 10 based on the star pointer object, vertex pointer object and move vector object (step S214). Then, the deformation algorithm method 104 adds 1 to the move direction table counter (step S215), returns information about the created deformation algorithm object 111 (step S216) and terminates the process.

If in step S211 the value of the counter exceeds six, the deformation algorithm method 104 halves the move amount Δp (step S217), adds 1 to the move amount counter (step S218), assigns 1 in the move direction table counter (step S219) and executes the processes in steps S212 and after.

Figure 44:
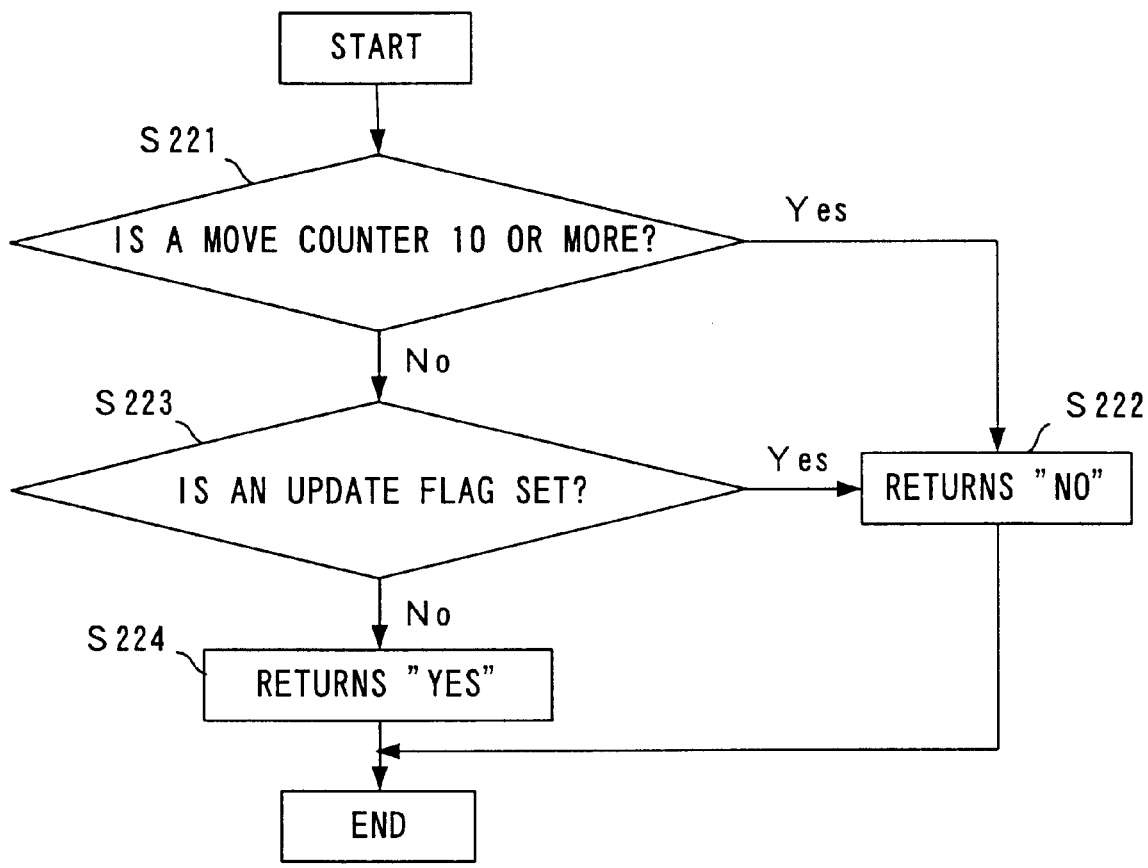
FIG. 44 is a flowchart showing the process of the fourth notice method.

FIG. 44 is a flowchart showing a notice method 105 possessed by the deformation algorithm group object 101. The notice method 105 first checks the value of a move amount counter (step S221). If the value of the counter is 10 or more, the notice method 105 returns "No" (step S222) and terminates the process.

If the value of the counter is less than 10, the notice method 105 checks an update flag (step S223). If the update flag is set, the notice method 105 returns "No" (step S222) and terminates the process. If the update flag is not set, the notice method 105 returns "Yes" (step S224) and terminates the process.

Figure 45:
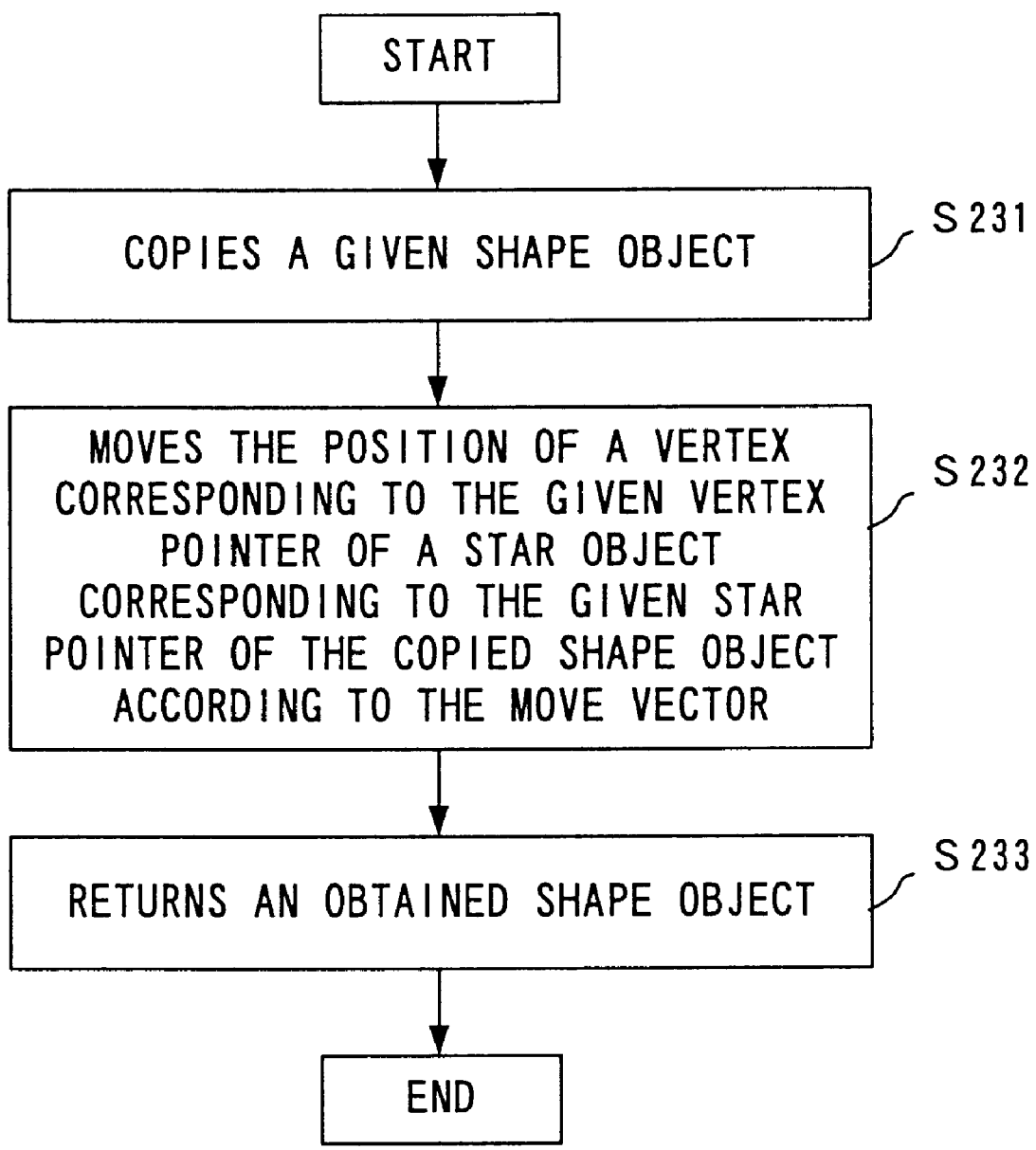
FIG. 45 is a flowchart showing the process of the second deformation method.

The deformation algorithm object 111 created in step S214 shown in FIG. 43 has a star pointer object, a vertex pointer object and a move vector object, and executes the processes shown in FIG. 45.

FIG. 45 is a flowchart showing a deformation method 112 possessed by the deformation algorithm object 111. The deformation method 112 first generates a copy of a given shape object 42 (step S131). Then, the deformation method 112 moves the position of a vertex corresponding to the given vertex pointer of a star object 233 corresponding to a given star pointer included in the copy according to the move vector (step S232). Then, the deformation method 112 returns the obtained shape object (step S233) and terminates the process.

In this problem, a display method 123 possessed by the shape display object 121 shown in FIG. 11 executes the same process as that in FIG. 33, and if a timing flag and a status flag match, the display method 123 displays a search shape.

Figure 46:
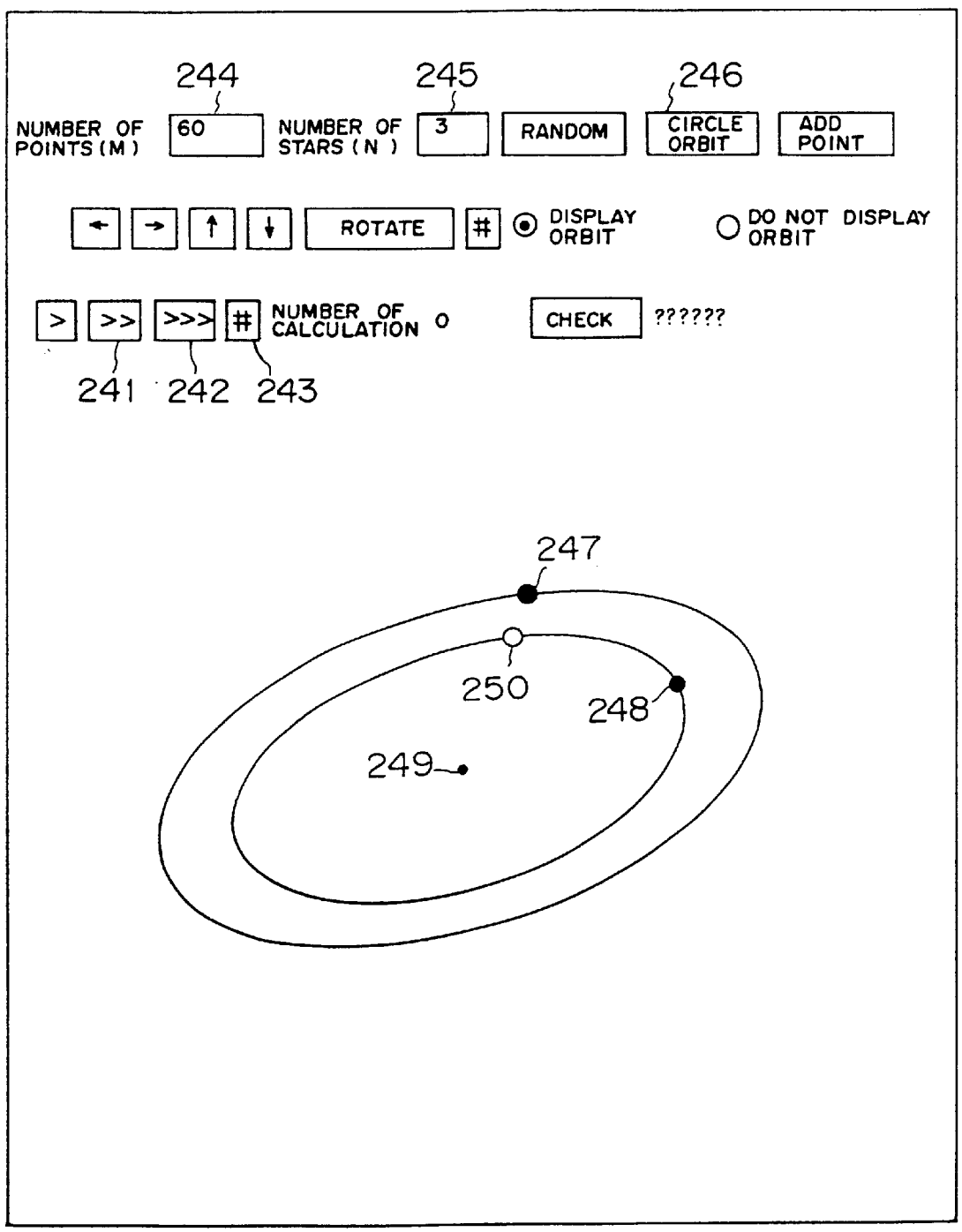
FIG. 46 shows the fourth display screen.
Figure 47:
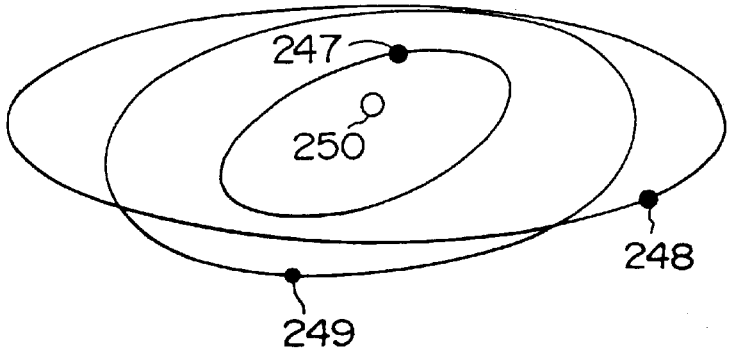
FIG. 47 shows the fifth display screen.

FIGS. 46 and 47 show examples of a display screen in the simulation of an N-body problem. In the display screen shown in FIG. 46, buttons 241 and 242 correspond to start buttons, and a button 243 corresponds to a stop button. For example, if the start button 241 is pushed, a timing flag is set to logic "0", and if the start button 242 is pushed, the timing flag is set to logic "1".

Fields 244 and 245 are the input fields for the number of vertexes M and the number of stars N, respectively. For example, if a user inputs M=60 and N=3 and pushes a circle orbit button 246, a starting shape including three stars 247, 248 and 249 are displayed. In this starting shape, stars 247 and 248 travel along an elliptical orbit, and star 249 stands still at the center of this orbit. Point 250 indicates the position of the center of gravity of the three stars.

If a search is performed using the shape shown in FIG. 46 as a starting shape, the orbit of each star changes as shown in FIG. 47. It is seen from FIG. 47 that the orbit of star 247 is located in the innermost position, and star 249 which previously stood still travels along an orbit located between stars 247 and 248.

In this way, in an N-body problem, stable orbits can be obtained while changing the entire shape by representing the orbits of N stars with the aggregate of a plurality of points and by moving each of the points. A user can automatically obtain the stable orbits of the stars simply by inputting predetermined parameters.

Although in the specific examples described above, a shape model indicated by a shape object 42 corresponds to the shape or track of a physical object included in a given problem, generally speaking, the shape object 42 does not necessarily correspond to a physical object. For example, in the case of an optimum cost problem in the fields of economy, business, etc., a shape model is created by combining a date, an amount of money, the number of people, etc. In this case, the deformation process of the shape can also be displayed on a screen.

Figure 48:
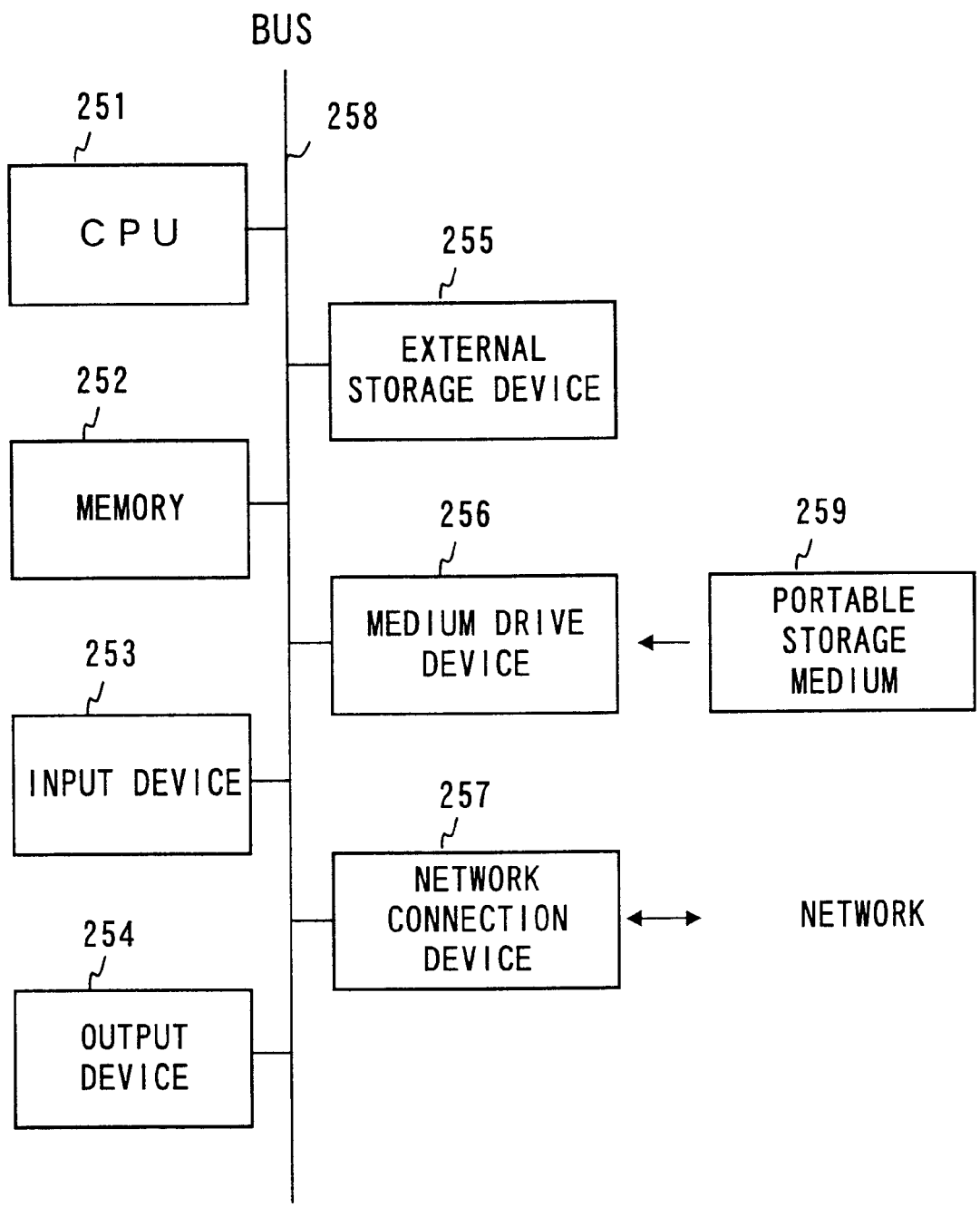
FIG. 48 shows the configuration of an information processing device.

The processing apparatus shown in FIG. 2 can also be configured using an information processing device (computer) shown in FIG. 48. The information processing device shown in FIG. 48 comprises a CPU (central processing unit) 251, a memory 252, an input device 253, an output device 254, an external storage device 255, a medium drive device 256 and a network connection device 257, and they are connected with each other using a bus 258.

The memory 252 includes, for example, a ROM (read only memory), RAM (random access memory), etc., and stores a program and data used for a process. The CPU 251 executes a necessary process by carrying out the program using the memory 252.

The search engine 11, search termination condition for each deformation element 12, sequencing algorithm for each deformation element 13, search termination condition 14, cost function 15, deformation pattern 16, shape 21, deformation elements 23 and creation units 31 through 36 correspond to the software components stored in the specific program code segments of the memory 252, and can be realized by a program consisting of one or more instructions.

The input device 253 includes, for example, a keyboard, pointing device, touch panel, etc., and is used for a user to input instructions and information. The output device 254 includes, for example, a display, printer, speaker, etc., and is used to output inquiries to a user and process results.

The external storage device 255 includes, for example, a magnetic disk device, optical disk device, magneto-optical disk device, etc. The above-described program and data can also be stored in this external storage device 255, and can be loaded to the memory 252 to be used, as the occasion arises. The external storage device 255 can also be used as a database for storing the common components and individual components shown in FIG. 2.

The medium drive device 256 drives a portable storage medium 259, and accesses the recorded content. As the portable storage medium 259, an arbitrary computer-readable storage medium, such as a memory card, floppy disk, CD-ROM (compact disk read only memory), optical disk, magneto-optical disk, etc. can be used. The above-described program and data can also be stored in this portable storage medium 259, and can be loaded to the memory 252 to be used, as the occasion arises.

The network connection device 257 communicates with an external device through an arbitrary network (line), such as a LAN (local area network), etc., and performs a data conversion accompanying communications. The network connection device can also receive the above-described program and data from the external device, and can load the program and data to the memory 252 for use, as the occasion arises.

Figure 49:
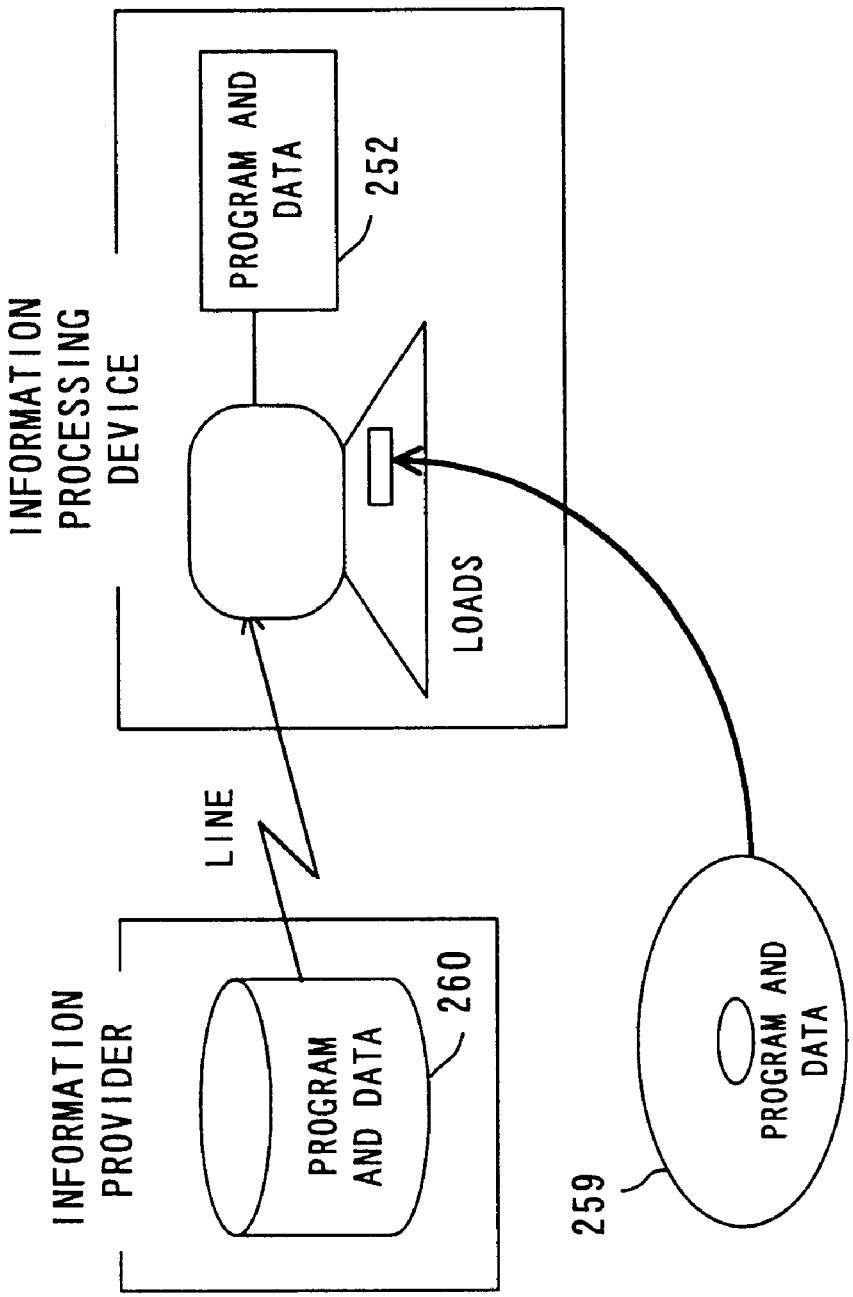
FIG. 49 shows storage media.

FIG. 49 shows computer-readable storage media for providing the information processing device shown in FIG. 48 with a program and data. The program and data stored in the portable storage medium 259 or an external database 260 are loaded to the memory 252. Then, the CPU 251 executes a necessary process by carrying out the program using the data.

According to the present invention, a highly versatile algorithm can be realized by converting an optimization problem to be processed into a shape model. The process of problem solution can be presented to a user by displaying the deformation process of the shape model, and the user can visually understand the presented process.

What is claimed is:

1. A processing apparatus, comprising:
   a creation unit creating a shape model representing a given problem, the shape model including a plurality of deformation elements;
   a storage unit storing data on the shape model;
   a deformation unit deforming the shape model by applying, in a specific sequence designated by a user, a plurality of deformation operations selected by the user; and
   an output unit checking whether a timing flag and a status flag match, the status flag alternatively indicating one of a state where a search is completed for one of the deformation elements and a state where a search is completed for all the deformation elements, and visually displaying a deformed shape model when the timing flag and the status flag match,
   wherein the deformed shape model is not displayed when the timing flag and the status flag do not match, and
   wherein a timing of the displaying is changed by controlling a value of the timing flag.

2. The processing apparatus according to claim 1, wherein said deformation unit deforms the shape model based on the deformation elements.

3. The processing apparatus according to claim 1, wherein at least one of said creation unit, storage unit, deformation unit and output unit includes a common component independent of the given problem.

4. The processing apparatus according to claim 1, wherein at least one of said creation unit, storage unit, deformation unit and output unit includes an individual component replaceable according to the given problem.

5. The processing apparatus according to claim 1, wherein said output unit includes a shape display object which comprises a timing flag object having the timing flag, a status flag object having the status flag, and a display method for displaying the deformed shape model, and checks the timing and status flags of the timing and status flag objects by executing the display method.

6. A processing apparatus, comprising:
   a search unit creating a shape model representing a given problem using a plurality of deformation elements, deforming the shape model while changing at least one of the deformation elements by applying, in a specific sequence designated by a user, a plurality of deformation operations selected by the user and searching for a solution to improve a cost value of the shape model;
   a designation unit designating a search termination condition for each deformation element, an overall search termination condition, a process sequence of the deformation elements, a cost function and the deformation operations for the deformation elements; and
   an output unit checking whether a timing flag and a status flag match, the status flag alternatively indicating one of a state where a search is completed for one of the deformation elements and a state where a search is completed for all the deformation elements, and visually displaying a deformed shape model when the timing flag and the status flag match,
   wherein the deformed shape model is not displayed when the timing flag and the status flag do not match, and
   wherein a timing of the displaying is changed by controlling a value of the timing flag.

7. A computer-readable storage medium on which is recorded a program enabling a computer to perform:
   creating a shape model representing a given problem, the shape model including a plurality of deformation elements;
   deforming the shape model by applying, in a specific sequence designated by a user, a plurality of deformation operations selected by the user;
   checking whether a timing flag and a status flag match, the status flag alternatively indicating one of a state where a search is completed for one of the deformation elements and a state where a search is completed for all the deformation elements; and
   visually displaying a deformed shape model when the timing flag and the status flag match,
   wherein the deformed shape model is not displayed when the timing flag and the status flag do not match, and
   wherein a timing of the displaying is changed by controlling a value of the timing flag.

8. A process method comprising:
   converting a given problem into a shape model including a plurality of deformation elements;

deforming the shape model by applying, in a specific sequence designated by a user, a plurality of deformation operations selected by the user;

searching for a shape model with a good cost value;

checking whether a timing flag and a status flag match, the status flag alternatively indicating one of a state where a search is completed for one of the deformation elements and a state where a search is completed for all the deformation elements; and visually displaying a deformed shape model when the timing flag and the status flag match, wherein the deformed shape model is not displayed when the timing flag and the status flag do not match, and wherein a timing of the displaying is changed by controlling a value of the timing flag.

9. A process method comprising:

converting a given problem into a shape model comprising related elements;

providing a cost function corresponding to a cost of the given problem that calculates a cost of the shape model;

applying to each current element of the shape model, in a specific sequence designated by a user, a particular plurality of different deformation operations selected by the user, where each deformation operation is applied to a given current element to create a different deformation of the same given current element;

searching for a shape model with an optimal cost value by, for each deformation operation that is applied to each current element, calculating, with the cost function, a cost of the shape model having the so deformed current element, and deciding whether to adopt the so deformed current element to the shape model based on the calculated cost, where an adopted deformed element replaces its corresponding undeformed current element; and in accordance with a determination of the user, displaying the shape model with deformed elements at one time responsive to completion of a search for all the deformed elements, or displaying the deformed elements at different times responsive to completions of individual searches of the deformed elements.

10. A computer-implemented method for finding a solution to an optimization problem, comprising:

representing a solution of the optimization problem with a shape model comprising an arrangement of related points with current positions;

providing a cost function to calculate a cost of the solution of the problem based on the points of the shape model;

for each point in the shape model at its current position, applying a sequence of different geometric operations to move the point to different temporary positions relative to the shape model;

at each different temporary position of a given point, calculating a cost value by calculating the cost function based on the temporary position of the given point and based on the current positions of the other points of the shape model; and when the cost value indicates an improvement in the solution represented by the shape model with the temporary position of the given point, adopting the temporary position of the given point to be a new current position of the given point in the shape model.

* * * * *